(12) United States Patent
Bouzguarrou et al.

(10) Patent No.: US 11,249,762 B2
(45) Date of Patent: Feb. 15, 2022

(54) APPARATUS AND METHOD FOR HANDLING INCORRECT BRANCH DIRECTION PREDICTIONS

(71) Applicant: Arm Limited, Cambridge (GB)

(72) Inventors: Houdhaifa Bouzguarrou, Valbonne (FR); Guillaume Bolbenes, Antibes (FR); Thibaut Elie Lanois, Antibes (FR)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/662,438

(22) Filed: Oct. 24, 2019

(65) Prior Publication Data

US 2021/0124586 A1 Apr. 29, 2021

(51) Int. Cl.
*G06F 9/38* (2018.01)
*G06F 9/30* (2018.01)
*G06F 12/0875* (2016.01)

(52) U.S. Cl.
CPC ........ *G06F 9/3806* (2013.01); *G06F 9/30145* (2013.01); *G06F 9/3804* (2013.01); *G06F 12/0875* (2013.01); *G06F 2212/452* (2013.01)

(58) Field of Classification Search
CPC .................................................. G06F 9/3806
See application file for complete search history.

(56) References Cited

U.S. PATENT DOCUMENTS

| | | | | |
|---|---|---|---|---|
| 6,076,144 A * | 6/2000 | Peled | .................... | G06F 9/3804 711/125 |
| 2014/0075168 A1 * | 3/2014 | Abdallah | ............. | G06F 9/3848 712/240 |
| 2014/0201508 A1 * | 7/2014 | Busaba | ..................... | G06F 9/38 712/239 |
| 2014/0337605 A1 * | 11/2014 | Hall | ....................... | G06F 9/3806 712/239 |
| 2017/0139717 A1 * | 5/2017 | Hornung | ............. | G06F 9/30058 |

* cited by examiner

*Primary Examiner* — Michael J Metzger

(74) *Attorney, Agent, or Firm* — Nixon & Vanderhye P.C.

(57) ABSTRACT

An apparatus and method are provided for handling incorrect branch direction predictions. The apparatus has processing circuitry for executing instructions, branch prediction circuitry for making branch direction predictions in respect of branch instructions, and fetch circuitry for fetching instructions from an instruction cache in dependence on the branch direction predictions and for forwarding the fetched instructions to the processing circuitry for execution. A cache location buffer stores cache location information for a given branch instruction for which accuracy of the branch direction predictions made by the branch prediction circuitry is below a determined threshold. The cache location information identifies where within the instruction cache one or more instructions are stored that will need to be executed in the event that a subsequent branch direction prediction made for the given branch instruction is incorrect. Control circuitry is responsive to such a subsequent branch direction prediction to obtain from the cache location buffer the cache location information and to provide the obtained cache location information to the fetch circuitry to enable the fetch circuitry to retrieve from the instruction cache the one or more instructions that are to be executed in the event that the processing circuitry does determine that the subsequent branch direction prediction was incorrect.

25 Claims, 13 Drawing Sheets

| 105 | 110 | 115 | 120 | 125 | 130 | 135 |
|---|---|---|---|---|---|---|
| BRANCH INSTRUCTION IDENTIFIER (BRANCH INST$^N$ ADDRESS) | CACHE LOCATION INFORMATION FOR SEQUENCE OF INSTRUCTIONS TO BE EXECUTED IF BRANCH INSTRUCTION IS TAKEN | ASSUMED TARGET ADDRESS OF BRANCH | TAKEN PATH INFO VALID | CACHE LOCATION INFORMATION FOR SEQUENCE OF INSTRUCTIONS TO BE EXECUTED IF BRANCH INSTRUCTION IS NOT TAKEN | NOT TAKEN PATH INFO VALID | MOP /I$ INDICATORS |
| --- | --- | --- | --- | --- | --- | --- |
| --- | --- | --- | --- | --- | --- | --- |
| --- | --- | --- | --- | --- | --- | --- |
| --- | --- | --- | --- | --- | --- | --- |

| 400 | 405 | 410 |
|---|---|---|
| CACHE LOCATION INFORMATION FOR ENTRY (EITHER FOR TAKEN PATH OR NOT TAKEN PATH) | VALIDITY INFORMATION | FETCH ACROSS INFORMATION IF SEQUENCE EXTENDS THROUGH STRONGLY BIASED TAKEN BRANCH |
| INDEX / WAY OF FIRST BLOCK | VALID FLAG (NV/V/V) | - OFFSET OF BRANCH, AND PREDICT BLOCK BRANCH PRESENT IN |
| INDEX / WAY OF EACH ADDITIONAL BLOCK | VALID FLAG (NV/NV/V) | - TARGET ADDRESS OF BRANCH<br>- BRANCH TYPE |

FIG. 9

IF USING PREDICTION FOR FURTHER BRANCH INSTRUCTION (RATHER THAN RELYING ON STRONG DIRECTION BIAS)

CACHE LOCATION INFORMATION

| INDEX/WAY FOR PREDICT BLOCK 0 (INITIAL CACHE LOCATION INFORMATION) | OFFSET OF I8 IN PREDICT BLOCK 0, TARGET ADDRESS (I35) TYPE OF BRANCH | INDEX/WAY FOR PREDICT BLOCK K (FIRST ALTERNATIVE CACHE LOCATION INFORMATION) (FOR TAKEN PATH FROM I8) | INDEX/WAY FOR PREDICT BLOCK 1 (SECOND ALTERNATIVE CACHE LOCATION INFORMATION) (FOR NOT TAKEN PATH FROM I8) | CACHED LAST DIRECTION PREDICTION FOR I8 |
|---|---|---|---|---|
| 450 | 455 | 460 | 470 | 475 |

FIG. 11

APPARATUS AND METHOD FOR HANDLING INCORRECT BRANCH DIRECTION PREDICTIONS

BACKGROUND

The present technique relates to an apparatus and method for handling incorrect branch direction predictions.

In order to seek to increase the performance of data processing systems, it is known to use branch prediction circuitry to seek to make predictions in respect of branch instructions. The predictions are then used by fetch circuitry to determine the instructions to be fetched from memory for execution by the processing circuitry of the data processing system. In particular, branch instructions can cause a change in flow of the instructions being executed, dependent on whether the branch is taken or not taken. If the system were merely to wait until the processing circuitry has executed the branch instruction (and hence it is known whether the branch is taken or not taken) before fetching the next instructions to be executed, this would have a significant impact on performance. Instead, branch prediction circuitry is used to seek to predict whether a branch will be taken or not taken, so that the fetch circuitry can continue to fetch instructions on the basis of that prediction. If the prediction later proves wrong, then the processing pipeline can be flushed, and processing can be resumed from the point of misprediction.

In recent years, much research and development has been undertaken to seek to enhance the accuracy of branch prediction, thereby significantly reducing the misprediction rate, and reducing the instances where the processing pipeline needs to be flushed. However, when a misprediction is made, there is still a significant latency impact resulting from the need to flush the processing pipeline, and for processing to then resume from the point of misprediction. It would be desirable to provide techniques which can reduce the latency associated with misprediction.

SUMMARY

In a first example arrangement, there is provided an apparatus comprising: processing circuitry to execute instructions; branch prediction circuitry to make branch direction predictions in respect of branch instructions; fetch circuitry to fetch instructions from an instruction cache in dependence on the branch direction predictions and to forward the fetched instructions to the processing circuitry for execution; a cache location buffer to store cache location information for a given branch instruction for which accuracy of the branch direction predictions made by the branch prediction circuitry is below a determined threshold, the cache location information identifying where within the instruction cache one or more instructions are stored that will need to be executed in the event that a subsequent branch direction prediction made for the given branch instruction is incorrect; and control circuitry, responsive to the subsequent branch direction prediction being made for the given branch instruction, to obtain from the cache location buffer the cache location information and to provide the obtained cache location information to the fetch circuitry so as to enable the fetch circuitry to retrieve from the instruction cache the one or more instructions that are to be executed in the event that the processing circuitry determines that the subsequent branch direction prediction for the given branch instruction is incorrect.

In another example arrangement, there is provided a method of operating an apparatus to handle incorrect branch direction predictions, comprising: employing processing circuitry to execute instructions; making branch direction predictions in respect of branch instructions; employing fetch circuitry to fetch instructions from an instruction cache in dependence on the branch direction predictions and to forward the fetched instructions to the processing circuitry for execution; storing, within a cache location buffer, cache location information for a given branch instruction for which accuracy of the branch direction predictions is below a determined threshold, the cache location information identifying where within the instruction cache one or more instructions are stored that will need to be executed in the event that a subsequent branch direction prediction made for the given branch instruction is incorrect; and responsive to the subsequent branch direction prediction being made for the given branch instruction, obtaining from the cache location buffer the cache location information and providing the obtained cache location information to the fetch circuitry so as to enable the fetch circuitry, ahead of execution of the given branch instruction by the processing circuitry, to retrieve from the instruction cache the one or more instructions that are to be executed in the event that the processing circuitry determines that the subsequent branch direction prediction for the given branch instruction is incorrect.

In a further example arrangement, there is provided an apparatus comprising: processing means for executing instructions; branch prediction means for making branch direction predictions in respect of branch instructions; fetch means for fetching instructions from an instruction cache in dependence on the branch direction predictions and for forwarding the fetched instructions to the processing means for execution; cache location buffer means for storing cache location information for a given branch instruction for which accuracy of the branch direction predictions made by the branch prediction means is below a determined threshold, the cache location information identifying where within the instruction cache one or more instructions are stored that will need to be executed in the event that a subsequent branch direction prediction made for the given branch instruction is incorrect; and control means, responsive to the subsequent branch direction prediction being made for the given branch instruction, for obtaining from the cache location buffer means the cache location information and for providing the obtained cache location information to the fetch means so as to enable the fetch means to retrieve from the instruction cache the one or more instructions that are to be executed in the event that the processing means determines that the subsequent branch direction prediction for the given branch instruction is incorrect.

BRIEF DESCRIPTION OF THE DRAWINGS

The present technique will be described further, by way of illustration only, with reference to examples thereof as illustrated in the accompanying drawings, in which:

FIG. 3 is a diagram illustrating in more detail information provided within each entry of the cache location buffer 70 of FIG. 1 in accordance with one example arrangement;

FIG. 9 is a diagram illustrating in more detail the form of cache location information and associated information that can be captured within an entry of the cache location buffer in accordance with one example arrangement;

FIG. 11 illustrates an alternative form of cache location information that can be captured in order to allow fetching across a further branch instruction, in accordance with one example arrangement.

DESCRIPTION OF EXAMPLES

Figure 1:
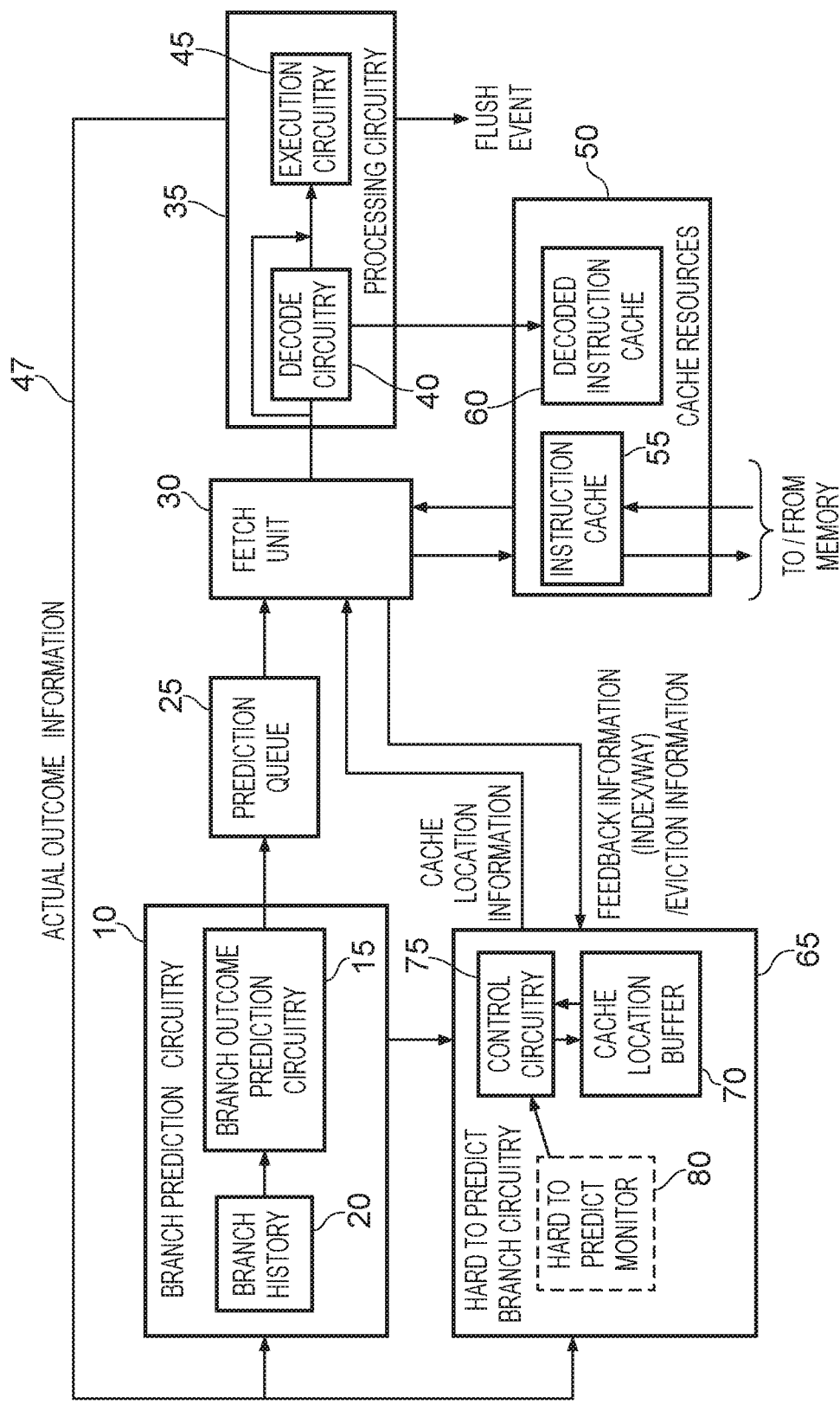
FIG. 1 is a block diagram of an apparatus in accordance with one example implementation.

In one example implementation, an apparatus is provided that has processing circuitry for executing instructions, and branch prediction circuitry for making branch direction predictions in respect of branch instructions. It will be appreciated that modern branch prediction circuits typically predict more than just the direction of the branch, and hence for example may predict the target address of a branch in the event that the branch is predicted as taken. However, for the purposes of the techniques described herein, it is the branch direction predictions that are of interest, and in particular situations where the branch direction predictions are incorrect.

The apparatus also has fetch circuitry for fetching instructions from an instruction cache in dependence on the branch direction predictions, and for forwarding the fetched instructions to the processing circuitry for execution. The instruction cache can take a variety of forms. For example, it may be used to cache instructions fetched from memory, in their original, undecoded, state, and when the fetch circuitry fetches instructions from such an instruction cache, and issues them to the processing circuitry, they will first be passed to decode circuitry within the processing circuitry, where the instructions will then be decoded in order to produce the required control signals to cause execution circuitry within the processing circuitry to perform the operations defined by each instruction. However, in modern data processing systems it is also possible to provide a decoded instruction cache, so that once instructions have been fetched and then decoded by the decode circuitry, those decoded instructions can be cached, so that if they are required again they can be provided to the required execution unit without needing to be re-decoded. The contents of the decoded instruction cache can hence be populated using the output of the decode circuitry. In particular, the decode circuitry will output a stream of decoded instructions, the decoded instructions also being referred to herein as macro operations or "mops".

The techniques described herein can be used in association with any form of instruction cache, whether that instruction cache is storing original, undecoded, instructions, or the decoded instructions produced by decode circuitry. Indeed, in some implementations the described technique can be used in association with both forms of cache.

In accordance with the techniques described herein, the apparatus is also provided with a cache location buffer to store cache location information for a given branch instruction for which accuracy of the branch direction predictions made by the branch prediction circuitry is below a determined threshold. The cache location information is used to identify where within the instruction cache one or more instructions are stored that will need to be executed in the event that a subsequent branch direction prediction made for the given branch instruction is incorrect. It will be understood that in a typical cache there are a number of different locations at which any individual instruction may be stored. For example, in a fully associative cache, any instruction may be stored within any entry of the cache. In a set associative cache, a portion of the instruction address is used to identify a set within the set associative cache, and then the instruction can be stored within any cache line within that set (a set typically including a cache line in each of the ways of the set associative cache). Typically it is necessary to perform a lookup operation using an instruction address in order to determine whether the instruction cache holds a copy of the instruction at that address. However, the cache location buffer enables the actual cache location of the one or more instructions to be identified, hence enabling those instructions to be retrieved directly from the instruction cache without needing to perform any lookup operation using an instruction address.

The apparatus then further provides control circuitry that is responsive to the subsequent branch direction prediction being made for the given branch instruction, to obtain from the cache location buffer the cache location information. The control circuitry then provides that obtained cache location information to the fetch circuitry so as to enable the fetch circuitry to retrieve from the instruction cache the one or more instructions that are to be executed in the event that the processing circuitry determines that the subsequent branch direction prediction for the given branch instruction is incorrect. By using the cache location information provided from the cache location buffer, the fetch circuitry can readily retrieve the required instructions quickly, without needing to perform a full lookup procedure using instruction addresses, enabling a significant reduction in latency in the event that a misprediction is made and the pipeline of the processing circuitry hence needs to be flushed. In particular, the fetch circuitry is in a position to provide more quickly the required instructions that the processing circuitry next needs to execute following the flush event than would be the case without using the present technique. As mentioned earlier, the required instructions can be fetched directly from the cache using the provided cache location information without needing to perform any lookup within the cache based on an instruction address of the next instruction to be executed as provided by the processing circuitry when indicating misprediction of the branch direction of the branch instruction.

Indeed, in one example implementation, the control circuitry is arranged to provide the obtained cache location information to the fetch circuitry in time to enable the fetch circuitry, prior to completion of execution of the given branch instruction by the processing circuitry, to retrieve from the instruction cache the one or more instructions that are to be executed in the event that the processing circuitry determines that the subsequent branch direction prediction for the given branch instruction is incorrect. Hence, as soon as the flush event occurs and is notified to the fetch circuitry, the fetch circuitry can be in a position to immediately forward to the processing circuitry the instructions that now need to be executed.

The cache location information can take a variety of forms. However, in one example implementation the cache location information seeks to capture both the cache locations for one or more instructions that will need to be executed if the branch is taken and the cache locations for one or more instructions that will need to be executed if the branch is not taken, and accordingly can provide suitable cache location information to the fetch circuitry for it to use irrespective of whether the given branch instruction is mispredicted as taken or mispredicted as not taken. Hence, in one example implementation the cache location information comprises first location information identifying where within the instruction cache one or more instructions are stored that are to be executed in the event that the given branch instruction has a taken branch direction, and second location information identifying where within the instruction cache one or more instructions are stored that are to be executed in the event that the given branch instruction has a not taken branch direction. The control circuitry is then arranged to be responsive to a taken branch direction prediction being made for the given branch instruction, to obtain from the cache location buffer the second location information associated with the not taken branch direction, and is arranged to be responsive to a not taken branch direction prediction being made for the given branch instruction, to obtain from the cache location buffer the first location information associated with the taken branch direction.

The techniques described herein can be used to enable the cache location buffer to store cache location information for multiple different branch instructions for which the accuracy of the branch direction prediction made by the branch prediction circuitry is below the determined threshold. Whilst for some of those branch instructions it may be possible to store the two different variants of location information, to cover both the taken and the not taken paths, in some instances it may be decided that for a certain branch instruction only one of the paths will be tracked. For example, whilst the not taken path may be stable, it could be that the taken path varies due to the target address varying for different instances of execution of that branch instruction. Hence, for such branch instructions, location information for only one of the possible paths may be tracked within the cache location buffer, but that location information can still be provided to the fetch circuitry when the prediction made is in respect of the other path, so that in the event of a misprediction the fetch circuitry is readily able to provide the required instructions to the processing circuitry.

In one example implementation, an entry within the cache location buffer used to store the first location information comprises a target address field used to identify a predicted target address for the given branch instruction, and that predicted target address is provided to the fetch circuitry with the first location information. In particular, when providing the fetch circuitry with cache location information about the taken path, it is useful to also provide information about the target address that has been assumed when capturing the cache location information for that taken path. If the given branch instruction is predicted as not taken, but a flush event then occurs because the processing circuitry determines that the branch is in fact to be taken, during the flush event the processing circuitry will output the actual target address identifying the next instruction to be executed, and at this point the fetch circuitry can compare that target address against the predicted target address provided when forwarding the first location information to the fetch circuitry. Assuming that matches, then the fetch circuitry can begin to issue to the processing circuitry the instructions that it has retrieved from the instructions cache using the first location information provided from the cache location buffer. This significantly reduces latency, since the fetch circuitry can already have prefetched those instructions ready to issue before the branch is resolved, and before the flush event occurs, and then merely needs to check that the target address indicated by the processing circuitry as part of the flush event matches the target address that was assumed in relation to the instructions whose cache locations were identified by the first location information. If the target addresses do not match, then the fetch circuitry can merely discard the prefetched instructions and process the flush event in the standard manner.

The branch prediction circuitry can be arranged to operate in a variety of ways. However, in one example implementation the branch prediction circuitry is arranged to analyse blocks of instructions and to produce a prediction result for each block that is dependent on branch direction predictions made for any branch instructions appearing in the associated block. The apparatus may then further comprise a prediction queue to store the prediction results produced by the branch prediction circuitry in order to identify the instructions to be fetched by the fetch circuitry for execution by the processing circuitry. The one or more instructions for which cache location information is provided may then comprise instructions within one or more of the blocks of instructions. Since the cache location buffer is merely seeking to store cache location information for the instructions, rather than an indication of the instructions themselves, the space requirement for the entries of the cache location buffer is relatively small, and each entry can be used if desired to identify multiple blocks of instructions that are to be executed in the event of a misprediction for the given branch instruction associated with that entry. For example, considering an n-way set associative cache, then a combination of the index and way information identifying a particular cache line is sufficient to identify at least one block of instructions, since a single cache line will typically be sized sufficiently to allow at least one block of instructions to be stored therein. Hence, multiple blocks of instructions can be identified merely by capturing multiple index and way combinations within the entry.

In one example arrangement, when the processing circuitry determines that the subsequent branch direction prediction for the given branch instruction is incorrect, the fetch circuitry is arranged to forward to the processing circuitry the one or more instructions retrieved from the instruction cache using the obtained cache location information, and the branch prediction circuitry is arranged to resume prediction from a block of instructions subsequent to a last instruction of the one or more instructions retrieved from the instruction cache using the obtained cache location information. Hence, in one example implementation branch prediction can be skipped for the instructions identified by the cache location information, which can further improve performance.

The last instruction may be a final instruction in a final identified block of instructions, or may be an instruction at some other location in the final identified block, in which case offset information can be used to identify the last instruction to be used from the final block.

Various limitations can be placed on the one or more instructions for which cache location information is to be provided in respect of any given branch instruction. For example, if desired, the one or more instructions for which cache location information is provided may comprise a contiguous sequence of instructions spanning one or more blocks of instructions. Hence, for example this contiguous sequence may comprise only instructions which are not branch instructions, and hence can be assumed to all require execution.

However, in other implementations there may be no requirement to limit the number of instructions that can be identified by the cache location information by such a constraint.

For example, in an alternative implementation the one or more instructions for which cache location information is provided may comprise a sequence of instructions that incorporates as a non-final instruction within the sequence at least one further branch instruction, the sequence of instructions being determined by making an assumption as to the branch direction of that at least one further branch instruction. Hence, in such an implementation it is allowed for the sequence of instructions that are identified by the cache location information to extend across at least one further branch instruction in certain situations, hence potentially allowing a larger number of instructions to be identified than might otherwise be the case.

However, in some implementations it may be considered only appropriate to do this if such a further branch instruction exhibits predictable behaviour. For example, in one implementation the at least one further branch instruction may be a branch instruction for which accuracy of the branch direction predictions made by the branch prediction circuitry is above a predictability threshold. Hence, if a further branch instruction is highly biased towards either being taken or either being not taken, then it can be assumed that execution of that branch instruction will cause it to take the highly biased path, and hence the sequence of instructions can be extended beyond that further branch instruction, hence increasing the number of instructions that can be prefetched by the fetch circuitry based on the cache location information obtained from the cache location buffer, and hence further improving performance. It should be noted that such behaviour does not cause any issues with regard to correct execution behaviour of the apparatus, since each branch instruction will be resolved by the execution circuitry of the processing circuitry in due course, and in the event that any assumption made about the branch direction behaviour of the further branch instruction was incorrect, this will be handled in the usual way via a flush event.

In some instances, it may be considered appropriate to only allow fetching across a further branch instruction to occur if the branch direction behaviour of that further branch instruction is highly biased. However, in alternative implementations it may be considered unnecessary to place such a restriction on the determination of the sequence of instructions for which cache location information is to be provided. For example, in an alternative implementation the cache location information may comprise initial cache location information for an initial portion of the sequence of instructions up to a first of the at least one further branch instruction, and alternative sets of cache location information associated with the taken and not taken paths for each further branch instruction. In one example implementation, the initial cache location information and each of the alternative sets of cache location information could be captured within the entry allocated for the given branch instruction. Alternatively, separate entries could be captured for the given branch instruction and each of the further branch instructions, with the various entries then being linked so that the control circuitry can establish the cache location information to be forwarded to the fetch circuitry in respect of the given branch instruction, based on the cache location information stored in each of the linked entries.

The branch prediction circuitry may be used to predict a branch direction for the at least one further branch instruction in order to determine which of the alternative sets of cache location information to use in combination with the initial cache location information to identify cache locations for the determined sequence of instructions. Hence, when the cache location information to be forwarded to the fetch circuitry is being determined by the control circuitry, the control circuitry can take into account a prediction made by the branch prediction circuitry for each further branch instruction when deciding which of the various alternative sets of cache location information to use in order to identify the cache locations for the determined sequence of instructions that the fetch circuitry is to issue to the processing circuitry in the event that a misprediction is detected by the processing circuitry for the given branch instruction. Such an approach can enable an increase in the number of instructions that can be identified by the cache location information, hence providing potential further performance improvements. As mentioned above, in the event that any assumption made about the branch direction of a further branch instruction turns out to be incorrect, this will be detected in due course when that further branch instruction is executed by the processing circuitry.

There are a number of ways in which the control circuitry can take into account a prediction made by the branch prediction circuitry for each further branch instruction when deciding which of the various alternative sets of cache location information to use. For instance the last prediction made for each such further branch instruction can be cached (for example in the cache location buffer) and then referred to by the control circuitry. Alternatively, the control circuitry could invoke the branch prediction circuitry to make a prediction for each further branch instruction at the time it is seeking to determine the cache location information to be forwarded to the fetch circuitry.

In one example implementation, the at least one further branch instruction that is to be fetched across is a branch instruction that is predicted to have a not taken branch direction. It will be appreciated that it is immediately apparent what the next instruction to be executed after the further branch instruction will be if the not taken path is followed, i.e. it will be the immediately following instruction in the instruction address space. Hence, the cache location information provided when fetching across such a further branch instruction will be highly accurate, assuming the prediction that execution of that further branch instruction will result in the not taken path is correct.

However, if desired, the apparatus can be arranged to also allow fetching across further branch instructions that are predicted as taken. In such instances, it will be appreciated that the one or more instructions for which the cache location information is provided will comprise a sequence of instructions within at least two non-contiguous blocks of instructions, since the taking of the further branch will cause a discontiguous jump in instruction address.

In situations where the instruction sequence can include a further branch instruction that is predicted as taken, then in one example implementation an entry within the cache location buffer storing the cache location information further comprises an additional information field to identify at least a position within the sequence of each further branch instruction predicted to have a taken branch direction, and a predicted target address for that further branch instruction. This information can be provided to the fetch unit along with the cache location information, and can in due course be forwarded on to the processing circuitry for use during branch resolution when executing the further branch instruction.

As mentioned earlier, the instruction cache can take a variety of forms but in one example implementation has an n-way set associative cache structure, and the cache location information comprises index and way information for each cache line storing the one or more instructions for which the cache location information is provided.

There are a number of ways in which the cache location information can be populated within the cache location buffer for each given branch instruction for which it is decided to track cache location information. In one example implementation the cache location buffer comprises a plurality of entries, and on detection that the accuracy of the branch direction predications made by the branch prediction circuitry for a given branch instruction is below a determined threshold, the cache location buffer is arranged to allocate an entry to store the cache location information for that given branch instruction. The cache location buffer can then be arranged to receive feedback information from the fetch circuitry indicative of locations within the instruction cache from which one or more instructions are obtained following taken and not taken branch direction predictions made in respect of the given branch instruction, in order to enable the cache location buffer to determine the cache location information to be stored in the allocated entry. Hence, it will be appreciated that the cache location buffer can build up the contents required in respect of the entry for the given branch instruction by monitoring the instructions executed following a taken prediction in respect of that given branch instruction, and following a not taken prediction made in respect of that given branch instruction. The allocated entry can then be made a valid entry once the cache location information has been populated in the entry based on the feedback information from the fetch circuitry. The control circuitry can then be arranged to only provide to the fetch circuitry cache location information obtained from valid entries in the cache location buffer.

In one example implementation, separate entries may be kept to identify the cache location information for the one or more instructions that are to be executed in the event that the given branch instruction has a taken branch direction, and to identify the cache location information for the one or more instructions that are to be executed in the event that the given branch instruction has a not taken branch direction. Hence, the individual entries can be rendered valid when the associated cache location information has been populated within those entries.

However, in an alternative implementation the same entry can be used to capture the cache location information for both the taken path and the not taken path. In one such example implementation, separate validity flags are kept for the cache location information for the one or more instructions that are to be executed in the event that the given branch instruction has a taken branch direction, and for the cache location information for the one or more instructions that are to be executed in the event that the given branch instruction has a not taken branch direction. The control circuitry is then arranged to use the separate validity flags to determine whether the entry is valid for the cache location information associated with the branch direction opposite to that identified by the subsequent branch direction prediction made for the given branch instruction. Hence, once the required cache location information for one of the branch directions is available, the entry can be rendered valid for that cache location information even if the cache location information associated with the other path has not yet fully been populated.

If desired, in situations where the one or more instructions for which cache location information is provided comprise instructions from multiple blocks of instructions, separate validity flags may be kept in association with the cache location information for each block of instructions within the multiple blocks. Hence, purely by way of example, if the space provided in the entry allows cache locations for up to three blocks of information to be stored to form the cache location information for one of the paths (i.e. the taken path or the not taken path), and at a particular point in time only the cache location information for the first block has been obtained, that cache location information can be marked as valid even though information has not been obtained for the second or the third block, and in the interim the control circuitry can provide the cache location information for the first block to the fetch circuitry if required.

In one example implementation, the cache location buffer is further arranged to receive eviction information indicating locations within the instruction cache from which instructions are evicted, to thereby cause the cache location buffer to invalidate an entry whose stored cache location information identifies a location from which instructions have been evicted since that entry was made a valid entry. Hence, in addition to populating the entries based on feedback information received from the fetch circuitry, in situations where it is determined that certain instructions have been evicted from a cache, then the contents of the cache location buffer can be updated accordingly, by invalidating any out of date cache location information stored within the cache location buffer.

In implementations where a prediction queue is used to store the prediction results from the branch prediction circuitry, and the fetch circuitry is then used to reference the prediction queue in order to decide which instructions to fetch for forwarding to the processing circuitry for execution, it will be appreciated that the fetch circuitry will be receiving both information from the prediction queue and cache location information from the cache location buffer. In one example implementation, the fetch circuitry may be arranged to arbitrate access to the instruction cache between the prediction results stored in the prediction queue and the obtained cache location information provided by the control circuitry.

A number of different arbitration schemes can be used. However, in one example implementation, the fetch circuitry is arranged to use the obtained cache location information in at least one clock cycle where fetching instructions using the obtained cache location information rather than fetching instructions using the prediction results will not impact performance of the processing circuitry. Hence, if there is a free cycle where the fetch circuitry is not seeking to fetch any information from the instruction cache using the prediction results from the prediction queue, then the cache location information can be used to fetch instructions from the instruction cache. Otherwise, use of the cache location information can be delayed until an access to the instruction cache can be made using that cache location information, or indeed that cache location information could be discarded if there is too significant a delay.

However, in some implementations it may be considered desirable to allow the cache location information to be used in preference to processing of the prediction results from the prediction queue in certain situations. For example, if a particular branch instruction is considered particularly hard to predict it may be given a priority higher than the priority associated with the prediction results in the prediction queue, and hence be processed by the fetch circuitry ahead of the prediction results in the prediction queue. As another example, if the speculation based on the prediction results is getting significantly ahead of the execution pipeline, the cache location information can be given higher priority than the prediction results from the prediction queue when fetching instructions from the instruction cache.

There are a number of ways in which it may be determined that the accuracy of the branch direction predictions made by the branch prediction circuitry for a given branch instruction is below a determined threshold. For example, this may be considered to be the case when at least one misprediction of the branch direction has been made by the branch prediction circuitry for the given branch instruction.

However, alternatively further circuitry can be provided to monitor branch resolution information for the given branch instruction for multiple previous instances of execution of that given branch instruction. In particular, in one example implementation hard to predict monitor circuitry is used to monitor the branch resolution information in such a manner, in order to determine whether the accuracy of the branch direction predictions made by the branch prediction circuitry for the given branch instruction is below the determined threshold. The hard to predict monitor circuitry may then be arranged, in response to determining that the accuracy of the branch direction predictions made by the branch prediction circuitry for the given branch instruction is below the determined threshold, to cause the cache location buffer to allocate an entry to store the cache location information for that given branch instruction.

The hard to predict monitor circuitry can be organised in a variety of ways. For example, it may use statistical counters for various branch instructions, such that a misprediction of the direction of a branch instruction causes the associated counter to be incremented by a certain amount, and a correct prediction causes the associated counter to be decremented by a certain amount (the amount may differ so that the increment amount is not necessarily the same as the decrement amount). If the count value reaches a certain threshold, then it will be considered that the associated branch instruction is difficult to predict, and accordingly an entry will be allocated in the cache location buffer. As another example, reference can be made to the structures used to predict branch outcomes within the branch prediction circuitry. For example, the prediction circuitry may operate as a TAGE (TAgged GEometric Length) predictor which makes use of a number of direction predicting tables also referred to as TAGE tables. Each TAGE table may be associated with a different length of history maintained within a branch history register, and in such instances if repeated allocations occur within the highest TAGE table, i.e. the table associated with the largest amount of branch history, this may indicate a high level of misprediction and be used to trigger an allocation of an entry within the cache location buffer.

Particular examples will now be described with reference to the Figures.

FIG. 1 is a block diagram of a data processing apparatus in accordance with one example implementation. The apparatus includes processing circuitry 35 for executing a sequence of instructions that have been fetched by a fetch unit 30. The processing circuitry may include decode circuitry 40 for decoding instructions provided by the fetch unit, and execution circuitry 45 (which may itself comprise a number of different execution units) for executing the decoded instructions. The fetch unit has access to cache resources 50. These may include an instruction cache 55, which can be used to store instructions in their original, undecoded, form as retrieved from memory or one or more lower levels of cache between the instruction cache 55 and memory. The fetch circuitry may seek to fetch instructions from the instruction cache 55, but in the event of a cache miss the requests may be propagated to a lower level of the cache hierarchy and/or main memory, in order to retrieve into the fetch unit the instructions that need executing.

As shown in FIG. 1, the fetch unit may also have access to a decoded instruction cache 60, also referred to herein as a mop cache, for storing decoded instructions as produced by the decode circuitry 40, the decoded instructions also being referred to as macro operations or mops herein. If the instructions that the fetch unit requires reside within the decoded instruction cache, they can be fetched from the decoded instruction cache, and then forwarded directly to the execution circuitry 45, without needing to be re-decoded by the decode circuitry 40. The techniques described herein can be applied in relation to either the instruction cache 55 or the decoded instruction cache 60, or indeed the techniques can be applied in respect of both the instruction cache and the decoded instruction cache 60.

Which instructions are fetched by the fetch unit is dictated by the output of a prediction queue 25 which includes storage to maintain a series of prediction results produced by branch prediction circuitry 10, with those prediction results then being referenced by the fetch circuitry to determine a sequence of instructions to be fetched for execution by the processing circuitry. As will be understood by those skilled in the art, when stepping through a sequence of instructions at sequential memory addresses, when a branch instruction is encountered this can cause a change in instruction flow, dependent on whether the branch instruction is taken or not taken. If the branch is not taken, then the next instruction to be executed will typically be the instruction immediately following the branch instruction (i.e. the one at the next incremented memory address), but if the branch is taken then instruction flow will branch to a target address that is determined for that branch instruction, such that the next instruction to be executed will be an instruction at that target address. Often, branch instructions can be conditional, and hence for any particular conditional branch instruction it will not always be the case that the branch is taken or not taken.

Branch prediction circuitry 10 can be used to seek to make predictions as to whether a branch will be taken or not taken, and may include a variety of different types of branch prediction components for use in making such predictions. Often, one or more of those components will operate based on knowledge of the previous history of actual execution by the processing circuitry as maintained within the branch history storage 20, with that information being maintained based on actual outcome information forwarded over path 47 back to the branch prediction circuitry 10 from the processing circuitry 35.

Often the branch prediction circuitry can be arranged to review blocks of instructions at a time, and each block may for example be referred to as a predict block herein. The predict block will in one implementation include a number of consecutive instructions in the memory address space, for example eight consecutive instructions. The branch prediction circuitry will seek to analyse the block of instructions in order to predict whether one or more of those instructions are branch instructions, and in the event that any instruction is a branch instruction, may seek to provide a prediction as to whether that branch is taken or not taken. This results in the generation of a prediction result for each predict block, which can be routed into the prediction queue 25. Each prediction result will identify a series of instructions, ending with either the final instruction in the predict block (in the event that the predict block contains no branch instructions that are predicted as taken) or the first branch instruction in the predict block predicted as taken. The next predict block considered by the branch prediction circuitry will then be either the next sequential predict block in the event that no taken branch was predicted in the current predict block, or will be the predict block containing the instruction at the target address of the first predicted taken branch in the current predict block.

The fetch unit can then use these prediction results in order to determine which instructions should be fetched for execution by the processing circuitry. In the event that the predictions made by the prediction circuitry are accurate, this can significantly improve performance, since the appropriate instructions can be fetched from the instruction cache resources 50 or lower levels of the memory hierarchy in advance of them being required by the processing circuitry, avoiding the need to await the actual outcome of the branch instruction before fetching the next instructions. In the event that a branch prediction proves to be incorrect, then the state of the processing circuitry can be restored to the point prior to the misprediction taking place, and processing can then resume from that point.

In addition to predicting whether a branch will be taken or not taken, which can be referred to as branch direction prediction, the branch prediction circuitry may also perform other forms of branch prediction, for example seeking to predict the target address of a branch that is predicted as taken. However, for the purposes of the following discussion, the branch direction prediction made by the branch prediction circuitry will be considered, and in particular a technique will be described that reduces the misprediction latency in situations where the branch direction prediction made by the branch prediction circuitry 10 is incorrect.

The branch prediction circuitry 10 may include branch outcome prediction circuitry 15 that can comprise one or more branch direction predictors for seeking to predict a branch outcome of a branch instruction, and in particular whether that branch is predicted as taken or not taken. The predictions made will typically be influenced by the branch history 20 maintained to take into account the actual outcome information obtained from the processing circuitry 35 when branch instructions are executed, and hence taking into account the true taken/not taken behaviour of the branch instructions.

In modern systems, the branch direction predictions made by the branch prediction circuitry 10 may be highly accurate. Nevertheless, as mentioned earlier, in situations where it is later determined that a branch prediction was incorrect, there is a significant latency incurred within the apparatus, as in that event a flush event will be issued by the processing circuitry 35 causing all of the instructions to be flushed from the pipeline, and the fetch unit 30 will then resume fetching instructions from the target address output by the processing circuitry when issuing the flush event. The techniques described herein aim to reduce the misprediction latency, and hence increase the overall performance of the apparatus.

In particular, as shown in FIG. 1 hard to predict branch circuitry 65 is provided that includes a cache location buffer 70 comprising a plurality of entries. Control circuitry 75 is provided to control access to the cache location buffer 70 and to control how the various entries are used. In particular, when it is determined for a given branch instruction that the accuracy of the branch direction predictions made by the branch prediction circuitry 10 is below a determined threshold, an entry can be allocated in the cache location buffer 70 for that given branch instruction. The control circuitry 75 is then arranged to monitor feedback information provided by the fetch unit 30 in association with subsequent iterations of execution of that given branch instruction for both a situation where the given branch instruction is taken and for a situation where the given branch instruction is not taken. In particular, the feedback information from the fetch unit will provide an indication of the index and way within either the instruction cache 55 or the decoded instruction cache 60 from which subsequent instructions were retrieved for both the taken path and the not taken path, and this information can be populated within the cache location buffer as cache location information. Thus, first cache location information can be populated within the entry to identify the location in the cache resources 50 of one or more instructions that are to be executed in the event that the given branch instruction has a taken branch direction, and second cache location information can be populated within the entry to identify the location in the cache resources 50 of one or more instructions that are to be executed in the event that the given branch instruction has a not taken branch direction.

For a branch instruction that is difficult to predict the branch direction for, it is likely that subsequent occurrences of the branch instruction will follow different paths, and hence the instructions associated with both the taken path and the not taken path are likely to be cached in the cache resources 50.

Typically, each cache line within the instruction cache 55 or the decoded instruction cache 60 is able to store at least one predict block of instructions, and hence an entire sequence of instruction within a predict block can be identified by a specific combination of index and way information, that index and way information directly identifying the cache line in which those instructions are stored. The size of each entry in the cache location buffer 70 can be varied dependent on implementation, dependent on the number of blocks of instructions that it is potentially desired to capture cache location information for in relation to the taken path and the not taken path of each branch instruction allocated an entry within the cache location buffer.

Once the control circuitry has populated the required cache location information within the entry, then that entry can be marked as a valid entry which can then be used during subsequent execution of the given branch instruction.

In particular, once a valid entry has been established for a given branch instruction, and then on a subsequent encountering of that given branch instruction within the code being executed the branch outcome prediction circuitry 15 makes a particular direction prediction for that given branch instruction, the control circuitry can be used in due course to perform a lookup within the cache location buffer for that given branch instruction, and for a branch direction opposite to the direction predicted. Hence, if the branch prediction circuitry 10 predicts the branch instruction as being taken, a lookup within the cache location buffer can be performed in order to seek to obtain the cache location information for the not taken path. Similarly, if the branch prediction circuitry 10 predicts the branch instruction as being not taken, a lookup can be performed within the cache location buffer 70 in order to obtain the cache location information for the taken path, and that cache location information can be provided to the fetch unit 30.

The time at which such a lookup is performed within the cache location buffer 70 by the control circuitry 75 may be dependent on implementation, and in principle can be performed at any time after the branch prediction circuitry has made the branch direction prediction for that given branch instruction. However, in one example implementation, the aim is to use the cache location information obtained from the cache location buffer to enable the fetch unit to prefetch the instructions at the locations in the cache identified by the cache location information during a few cycles prior to resolution of that branch instruction being determined by the execution circuitry 45, so that in the event that the execution circuitry determines that there has been a misprediction, and hence issues a flush event, the fetch unit 30 already has the necessary instructions that will need to be issued to the processing circuitry 35 when processing is resumed following the flush event. In one particular example implementation, the processing circuitry 35 will output an indication when the execution circuitry 45 is about to begin a branch resolution process in respect of the branch instruction. As that branch resolution process typically takes a number of clock cycles, this allows time for the lookup in the cache location buffer to be performed, for the cache location information to be provided to the fetch unit 30, and for the fetch unit to then seek to prefetch from the relevant cache resources 50 instructions residing at the specific cache locations identified by the cache location information.

In one example implementation, the cache location information retrieved from the cache location buffer may be arranged to always refer to either the instruction cache 55 or the decoded instruction cache 60, and hence the fetch unit implicitly knows which cache to access based on the provided cache location information. However, in an alternative implementation the cache location buffer may be able to simultaneously store cache location information pertaining to the instruction cache 55 and the decoded instruction cache 60, and hence for each item of cache location information provided to the fetch unit, an additional bit of information can be used to identify whether that information relates to the instruction cache 55 or the decoded instruction cache 60.

The threshold level of misprediction beyond which it is determined appropriate to allocate an entry in the cache location buffer can be set in a variety of ways. For example, it may simply be determined that as soon as there has been a direction misprediction for a particular branch instruction, the control circuitry will allocate an entry. This misprediction information may be detected from the actual outcome information received over path 47. Alternatively, a hard to predict monitor circuit 80 may be provided to monitor the history of prediction accuracy for certain branch instructions in order to determine whether their prediction accuracy is dropping below a determined threshold level. The hard to predict monitor 80 may operate in a variety of ways. For instance, it could maintain some form of statistical counter for each conditional branch instruction to track the accuracy of the branch predictions made. For example, the counter could be incremented by a certain amount when a misprediction occurs and be decremented by a certain amount when a correct prediction is made. It should be noted that the increment amount and the decrement amount do not need to be the same. Once the counter reaches a threshold level, it will be considered that the associated branch instruction is difficult to predict, and the hard to predict monitor 80 can send a signal to the control circuitry 75 to cause an entry to be allocated within the cache location buffer 70.

As another example, the hard to predict monitor 80 can monitor certain activities of components within the branch prediction circuitry 10 in order to make an inference as to branch prediction accuracy. For example, if there is a significant amount of allocation occurring into a TAGE table in respect of a particular branch instruction, this may indicate a higher level of misprediction, and may trigger the hard to predict monitor 80 to send a signal to the control circuitry 75 to cause an entry to be allocated in the cache location buffer 70 for the branch instruction in question.

In addition to the feedback information provided by the fetch unit to enable the control circuitry 75 to populate the cache location information within each allocated entry of the cache location buffer 70, the fetch unit may also provide eviction information to the hard to predict branch circuitry 65 in order to enable the contents of the various cache location buffer entries to be updated. In particular, the control circuitry 75 can determine whether there are any entries in the cache location buffer that are tracking cache location information corresponding to a cache line whose contents have been evicted, and in that instance can cause the relevant entry to be invalidated, or at least a portion of the cache location information identifying that cache line to be invalidated.

Figure 2:
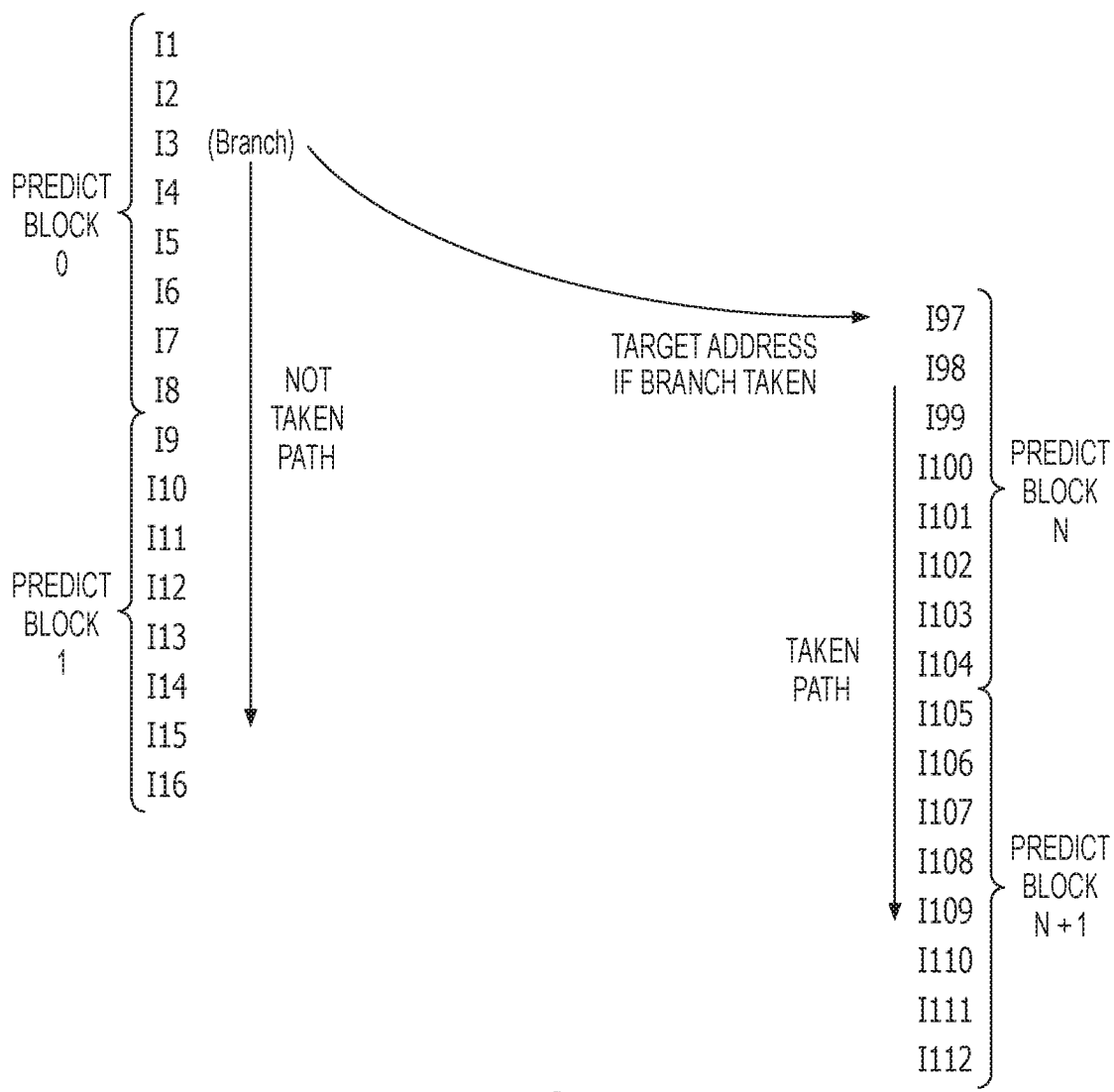
FIG. 2 is a diagram schematically illustrating not taken and taken paths in respect of a branch instruction.

FIG. 2 is a diagram schematically illustrating the processing of predict blocks, and the determination of not taken and taken paths in respect of branch instructions. In this example, it is assumed that predict block 0 is considered by the branch prediction circuitry 10, and it is determined that the instruction I3 within the predict block is a branch instruction. If that branch instruction is predicted as taken, then the prediction result produced for the predict block 0 will identify the instructions I1 to I3. The target address for the branch instruction I3 will then be predicted, and used to determine the next predict block to be considered by the branch prediction circuitry. In this case it is assumed that the target address points to the first instruction in predict block N. However, it should be noted that the target address does not necessarily need to be an address of an instruction at the beginning of a predict block, and hence could for example be a different instruction within predict block N, for example instruction 100. In that latter case, when the branch prediction circuitry is reviewing predict block N, it will begin its review from the target address of the branch instruction, e.g. from instruction 100.

FIG. 2 shows the not taken and the taken paths, assuming that there are no further branch instructions predicted as taken within the predict blocks shown. If it is determined that instruction I3 is hard to predict the branch direction for, either because there has been at least a single instance of misprediction, or because the hard to predict monitor 80 determines that instruction I3 is difficult to predict, then an entry will be established within the cache location buffer 70. Based on the feedback information provided from the fetch unit for subsequent occurrences of the taken path and the not taken path, the control circuitry will then seek to establish within the allocated entry for instruction I3 cache location information for both paths. In the particular example shown, it is assumed that the cache location buffer entries are sufficient to capture cache location information for two predict blocks, and that for both paths information about two predict blocks can be captured since no conditions are encountered which would dictate the curtailing of the cache location information to identify a smaller sequence of instructions. For instance, in one example implementation it may be assumed that as soon as a further branch instruction is encountered, the sequence of instructions to be identified for the associated path should terminate. However, as will be discussed in more detail later, in some instances, it is possible to fetch across one or more such branch instructions, for example if such a further branch instruction has a very predictable branch direction.

As mentioned earlier, each cache line in either the instruction cache 55 or the decoded instruction cache 60 may be sufficient to store at least one predict block's worth of instructions. Hence, a single combination of index and way information is sufficient to identify all of the instructions within a particular predict block. Thus, considering the specific example of FIG. 2, the cache location information captured for the not taken path may identify the predict blocks 0 and 1, and in particular identify the specific cache lines storing the instructions of those predict blocks. Similarly, the cache location information for the taken path will identify the specific cache lines storing the instructions of predict blocks N and N+1.

FIG. 3 schematically illustrates fields that may be provided within each entry of the cache location buffer 70 in accordance with one example arrangement. A first field 105 is used to store a branch instruction identifier for the branch instruction to which the entry relates. This branch instruction identifier can take a variety of forms, but in one example may take the form of the branch instruction address. Field 110 is then used to store cache location information for a sequence of instructions to be executed if the branch instruction is taken. As discussed earlier, this information can be populated by the control circuitry by monitoring the feedback information received from the fetch unit for a subsequent iteration of the code in which the branch instruction identified in the field 105 is taken, and in particular the cache location information can capture the index and way information for one or more blocks of instructions that are subsequently executed in the taken path.

Field 115 can also be provided to capture the assumed target address of the branch instruction identified in the field 105. This is useful, as it enables the fetch unit 30 to later check that the instructions that have been prefetched using the cache location information in the field 110 are in fact the instructions that are needed. In particular, in the event that the branch instruction is predicted as not taken, but when it is subsequently resolved by the execution circuitry 45 it is determined that the branch is taken, and accordingly a flush event is triggered, as part of that flush event the execution circuitry will identify the actual target address of the next instruction to be fetched. The fetch unit can then check that address against the assumed target address provided in the field 115 (that information can be forwarded to the fetch unit in addition to the cache location information) and in the event of a match then knows that the instructions it has prefetched based on the cache location information in the field 110 are the correct instructions to execute, and can immediately begin issuing those instructions to the processing circuitry 35.

A field 120 can be used to capture whether the information in the fields 110, 115 is valid. In particular, the valid flag will only be set once the information in those fields has been populated based on the feedback information received from the fetch unit. As will be discussed in more detail later a single valid flag can be provided for the entirety of the cache location information 110, or alternatively separate validity flags can be provided for each set of index and way information forming the cache location information in the field 110.

As also shown in FIG. 3, cache location information field 125 is provided in order to identify the cache location(s) for a sequence of instructions to be executed if the branch instruction is not taken, and a further field 130 can be used to identify when that information is valid. Again, multiple validity flags can be provided within the field 130 if desired, one for each set of index and way information.

As mentioned earlier, in one example implementation the cache location information may only be captured in relation to one of the cache resources, for example the instruction cache 55 or the decoded instruction cache 60. However, in an alternative implementation cache location information can be captured for both of those caches, and an additional field 135 can be used to capture mop cache or instruction cache indicators to identify whether the associated cache location information relates to the instruction cache 55 or the decoded instruction cache 60. In one example implementation, the entirety of the cache location information in a single entry may relate to only one of the instruction cache 55 or the decoded instruction cache 60, and accordingly a single bit field is all that is required to identify whether the cache location information relates to the instruction cache or the decoded instruction cache. However, alternatively, a finer granularity of division may be available within each entry, and accordingly for instance each particular item of cache location information may relate to either the instruction cache 55 or the decoded instruction cache, with the mop/instruction cache indicators 135 being sufficient to provide an indicator for each item of cache location information. The fetch unit is then able to use the mop/instruction cache indicator associated with each item of cache location information in order to determine whether that cache location information is identifying a particular cache line within the instruction cache 55 or a particular cache line within the decoded instruction cache 60.

Figure 4:
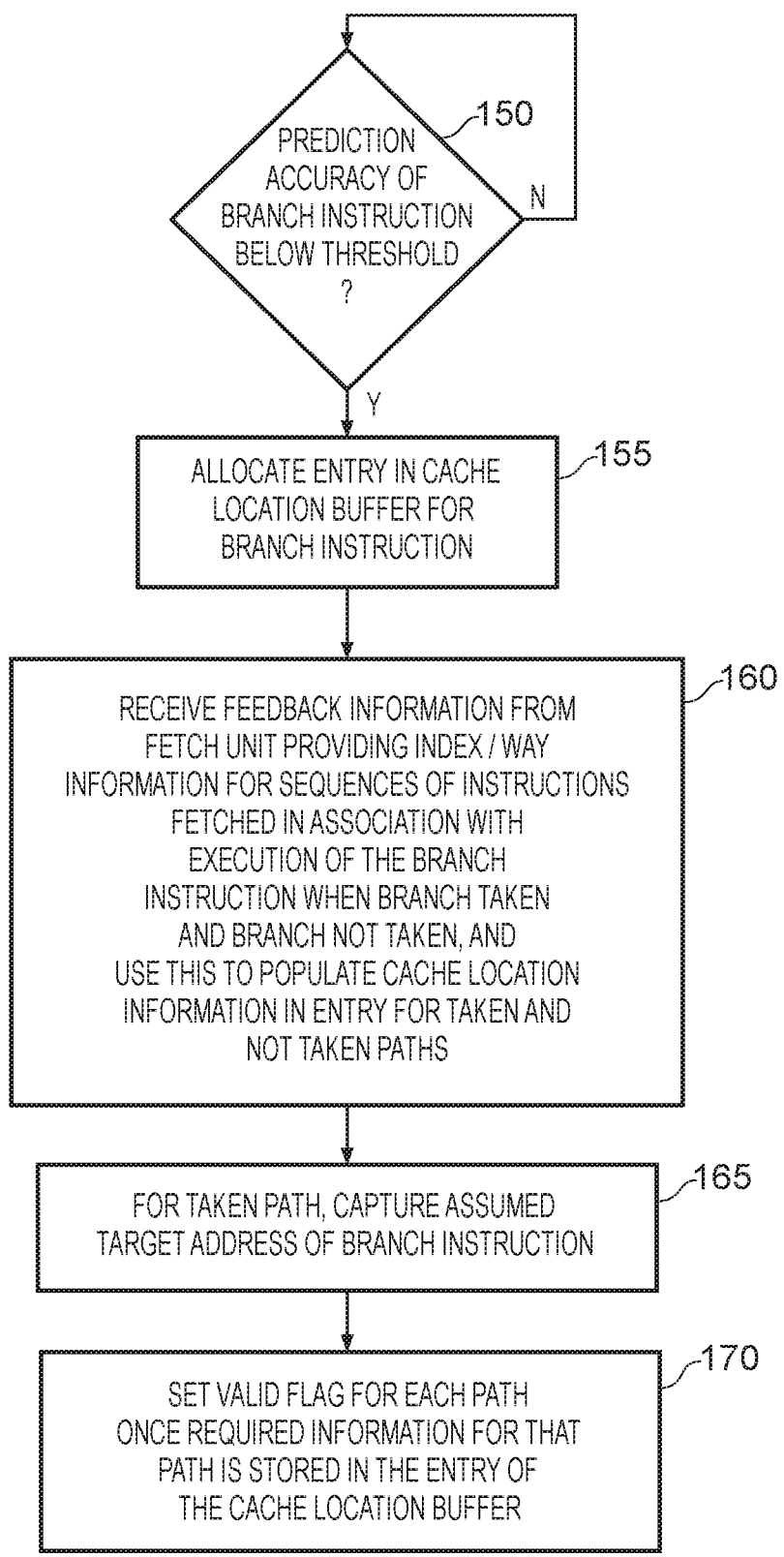
FIG. 4 is a flow diagram illustrating the operation of the control circuitry of FIG. 1 when allocating an entry in the cache location buffer in accordance with one example arrangement.

FIG. 4 is a flow diagram illustrating the steps taken when allocating entries in the cache location buffer. At step 150, it is determined whether the prediction accuracy of a given branch instruction is below a threshold. As discussed earlier, this may be determined in some instances if there is just a single occurrence of misprediction of the branch direction by the branch prediction circuitry 10, or alternatively this may be determined by the earlier-mentioned hard to predict monitor 80.

In the event that the prediction accuracy is determined to be below the threshold, then at step 155 the control circuitry 75 allocates an entry in the cache location buffer 70 for that branch instruction. Thereafter, the control circuitry 75 receives feedback information from the fetch unit 30 providing index and way information for sequences of instructions fetched in association with subsequent occurrences of the branch instruction, both for a situation where the branch is taken and for a situation where the branch is not taken. Hence, this can be considered a training phase where the control circuitry populates the cache location information in the allocated entry based on information derived from the next occurrence of the branch instruction that is taken and the next occurrence of the branch instruction that is not taken. The amount of information captured in relation to both the taken path and the not taken path will depend on the amount of storage provided within each entry, and hence the number of combinations of index and way information that can be captured for both the taken path and the not taken path, and detection of any situations that would cause an early termination of the training phase for either path. For example, as discussed earlier, in some instances it may be decided that it would be appropriate to terminate the information captured for either path when a further branch instruction is encountered. However, as will be discussed later, in some instances this is not necessary, and the information can extend across a branch instruction so that the total sequence of instructions identified by the cache location information does not terminate due to the further branch instruction.

At step 165, for the taken path, the assumed target address of the branch instruction for which the entry has been allocated at step 155 is also captured, this being the information discussed earlier with reference to field 115 of FIG. 3. If it is determined that the target address for the taken path is not predictable, then it may be determined that it is appropriate to not validate the cache location information produced for the taken path, and instead to only continue the training in respect of the cache location information for the not taken path. However, in many implementations, it is the case that conditional branch instructions are often direct branch instructions, and hence the target address can be determined directly from the branch instruction, for example by adding to the instruction address an immediate offset specified in the branch instruction, and hence the target address is predictable. Indirect branch instructions that are conditional may occur less frequently than direct branch instructions that are conditional, and hence it is expected there will be many instances where the cache location buffer can be used to store valid cache location information for both the taken path and the not taken path.

As indicated at step 170, the valid flag is set for each path once the required information for that path is stored in the entry of the cache location buffer. As discussed earlier with reference to FIG. 3, the valid flags can take a variety of forms, and hence for instance there may be a single valid flag relating to the entirety of the cache location information for a particular path, or separate validity flags may be provided in association with each item of cache location information stored for each path, i.e. for each index/way combination identified.

Figure 5A:
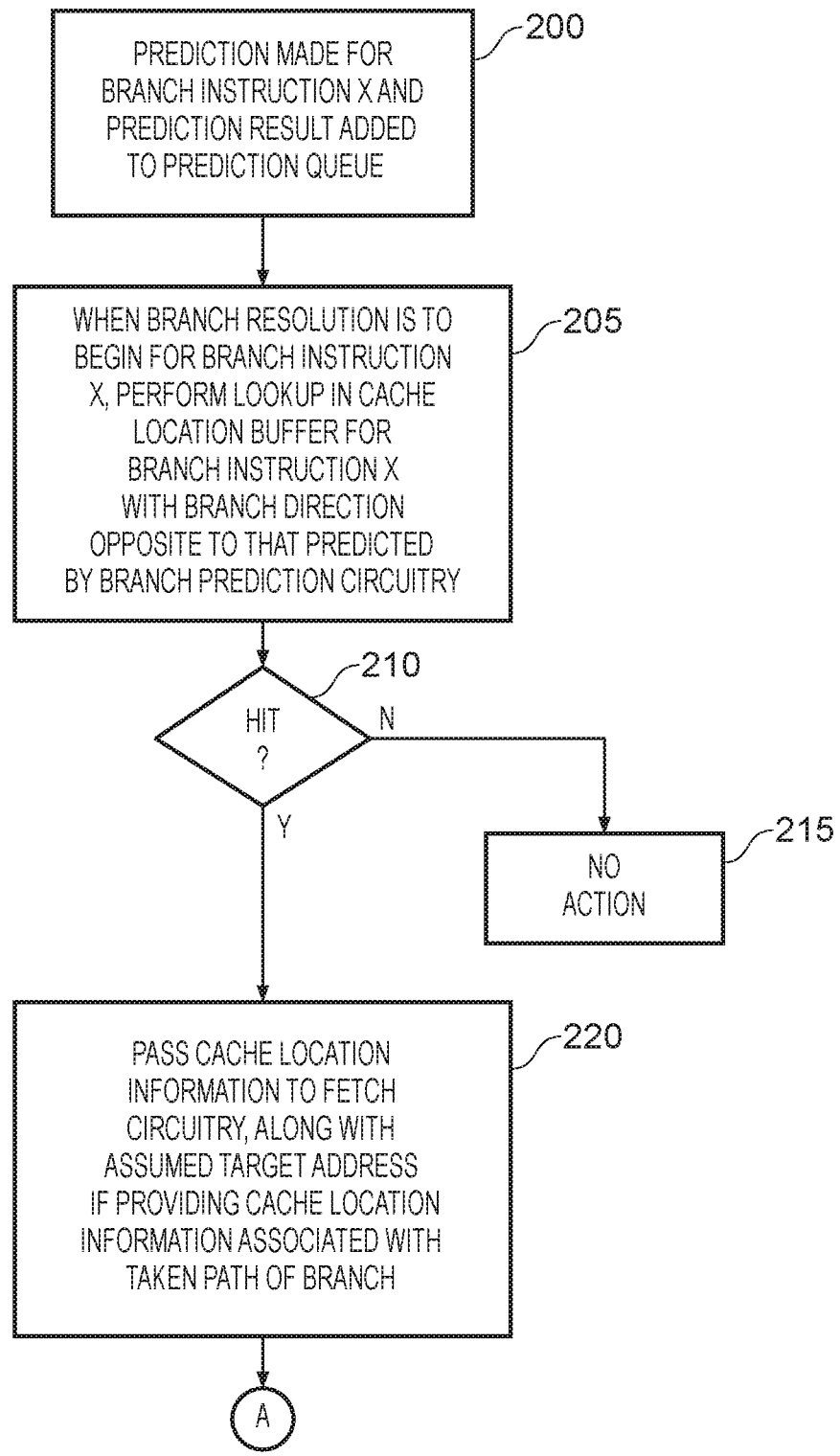
FIGS. 5A and 5B provide a flow diagram illustrating the steps taken by the apparatus of FIG. 1 when using cache location information stored within the cache location buffer, in accordance with one example implementation.
Figure 5B:
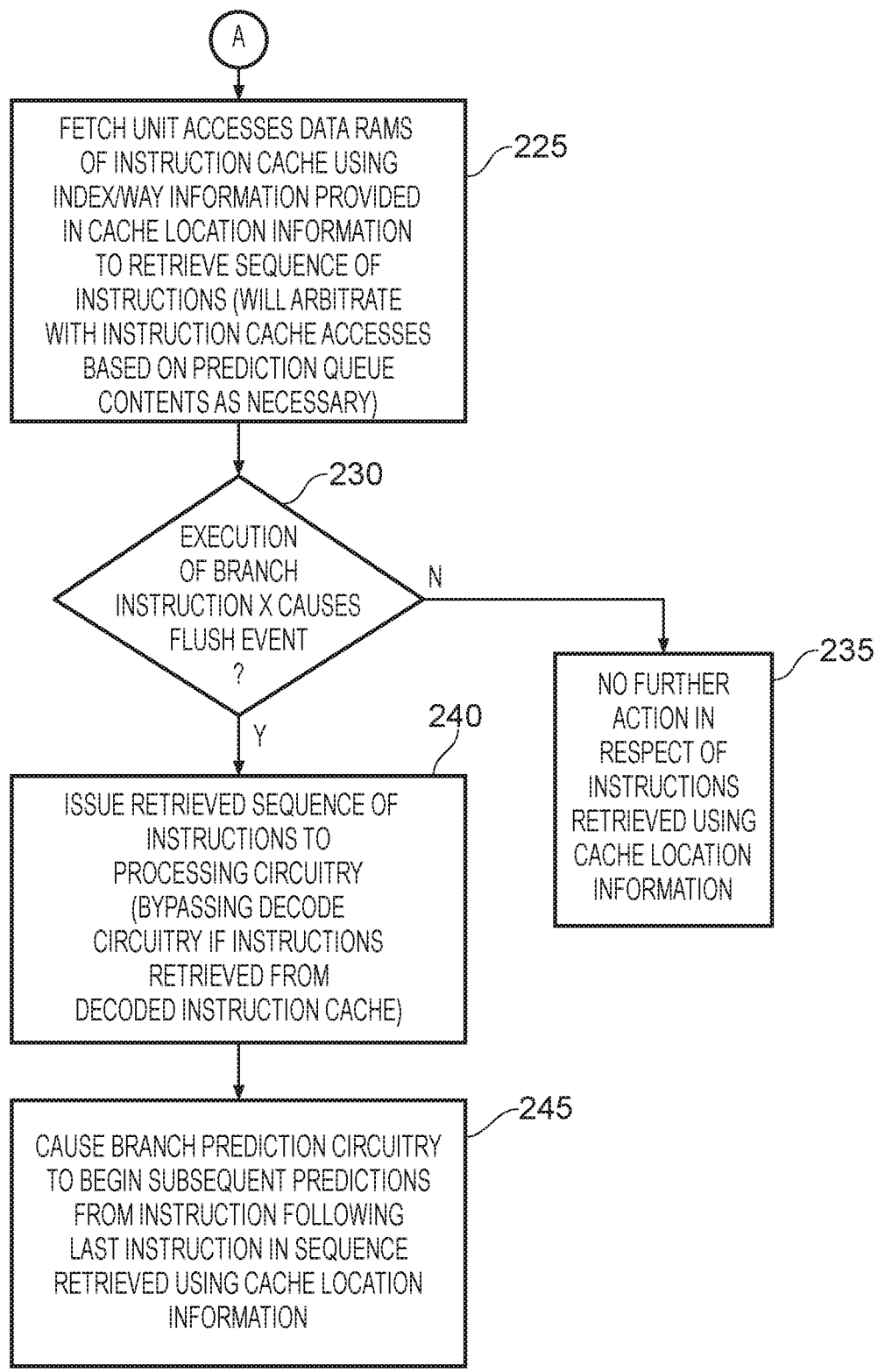

FIGS. 5A and 5B are flow diagrams illustrating the operation of the apparatus of FIG. 1 when using the cache location information obtained from the cache location buffer 70. At step 200, a prediction is made for a particular branch instruction (which we will refer to as branch instruction X in this example). The prediction result is then added to the prediction queue 25. As discussed earlier, the prediction result will typically be produced for a predict block, and hence in this instance the prediction result is for the predict block that includes the branch instruction X.

At some subsequent point after the branch prediction has been made, a lookup can be performed within the cache location buffer 70 by the control circuitry 75 to seek to detect whether branch instruction X has an entry in the cache location buffer, and whether that entry stores the cache location information for the branch direction opposite to that predicted by the branch prediction circuitry. However, in one example implementation it is preferable to defer performing that lookup until it is known that the branch instruction X will in fact be executed. For instance, it is possible that earlier branch instructions in the sequence may have an outcome which means that branch instruction X is not in fact executed, and accordingly there would be no need for a lookup within the cache location buffer for instruction X.

Hence, whilst the lookup could be performed at any point subsequent to the branch prediction being made, as indicated by step 205 in FIG. 5A, in one example implementation the lookup is performed when branch resolution is to begin for branch instruction X. In particular, after the fetch unit 30 has dispatched the branch instruction to the processing circuitry, then when the branch instruction reaches the execution circuitry, branch resolution circuitry within the execution circuitry will perform steps to resolve the branch. The branch resolution circuitry can issue a signal when it is about to begin branch resolution, and that signal can be used to trigger the lookup within the cache location buffer in order to provide the cache location information to the fetch unit, with the fetch unit then accessing the relevant instruction cache resources 50 in order to prefetch the instructions identified by the cache location information.

Whilst the lookup could be performed for any branch instruction that is about to be resolved by the execution circuitry, in one example implementation a lookup will only be performed for conditional branch instructions, since it is only conditional branch instructions for which a branch direction prediction needs to be made. Further, in some implementations, additional hint information may be passed through the pipeline in association with individual branch instructions to hint as to whether those branch instructions are difficult to predict, and this can be used to filter the situations in which a lookup is performed within the cache location buffer 70, so that a lookup is only performed for a subset of the conditional branch instructions, thereby reducing power consumption.

At step 210, it is determined whether there is a hit within the cache location buffer, and if not then, as indicated by step 215, no further action is required.

However, if a hit is detected, meaning that there is both an entry within the cache location buffer for branch instruction X, and there is valid cache location information for the branch direction opposite to the predicted branch direction, then the relevant cache location information is passed to the fetch circuitry at step 220 along with the assumed target address if the cache location information is being provided in association with the taken path of the branch.

At step 225, the fetch unit then accesses the data RAMs of the relevant instruction cache resource 50 using the index and way information provided in the cache location information in order to retrieve a sequence of instructions (as discussed earlier that sequence of instructions can span one or more predict blocks, dependent on the amount of index and way information provided). As discussed earlier, if the cache location buffer 70 can store information for both the instruction cache 55 and the decoded instruction cache 60, then additional information will be provided in association with the cache location information to identify whether the index and way information relates to the instruction cache 55 or the decoded instruction cache 60, hence informing the fetch unit as to which cache resource is to be accessed using that index and way information.

As will be apparent from FIG. 1, the fetch unit 30 is receiving information from both the prediction queue 25, and the cache location buffer, and accordingly will need to arbitrate between those two sources of information. In one example implementation, preference is generally given to the contents of the prediction queue, but the cache location information is used during clock cycles where accesses to the cache resources 50 using the cache location information will not impact on the performance of the processing circuitry. If there is conflict between accesses using the cache location information and accesses using the prediction results in the prediction queue, then typically use of the cache location information will be deferred until there is no conflict, and indeed if this causes too much delay the cache location information may be discarded. However, if the speculation based on the prediction queue is running significantly ahead of the execution being performed by the processing circuitry, then the cache location information may be given priority. Further, if a particular branch instruction is flagged as being particularly hard to predict, then the cache location information may again be given priority over the prediction queue, with the fetch unit performing an access based on the cache location information in preference to performing an access based on the prediction result information in the prediction queue.

At step 230 it is determined whether execution of branch instruction X has caused a flush event, i.e. whether at branch resolution time within the execution circuitry it is determined that the predicted direction was incorrect. If not, then at step 235 no further action in respect of the instructions retrieved using the cache location information is needed, and those instructions can merely be discarded by the fetch unit from its internal buffers.

However, if execution of branch instruction X does cause a flush event, then the retrieved sequence of instructions can be issued to the processing circuitry at step 240. This can include bypassing the decode circuitry if the instructions retrieved using the cache location information have been retrieved from the decoded instruction cache 60. As discussed earlier, in the event that the retrieved instructions relate to a taken path, then the assumed target address information retrieved from the field 115 of the entry in the cache location buffer can be compared against the actual target address specified by the processing circuitry when issuing the flush event in order to check that the instructions do in fact relate to the instructions that need to be executed, and in the event of a match then that sequence of instructions can be issued at step 240.

As indicated by step 245, the branch prediction circuitry 10 can resume subsequent predictions from the instruction following the last instruction in the sequence retrieved using the cache location information. The last instruction may be the very final instruction in the final predict block identified by the cache location information, or in some instances may be an instruction part way through that final predict block, in which case that last instruction will typically be identified by offset information provided in association with that final predict block.

Figure 6:
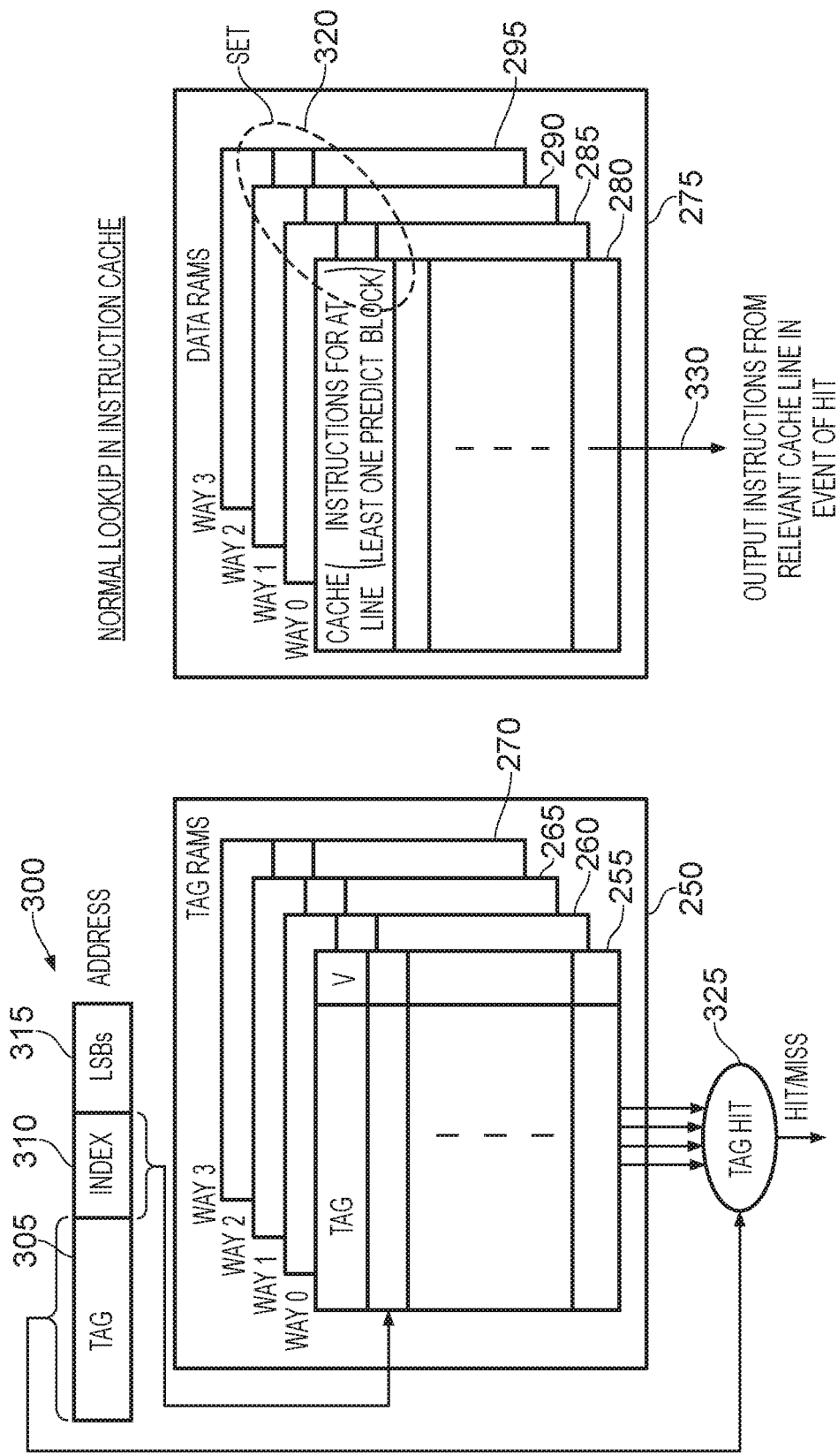
FIG. 6 is a diagram schematically illustrating a set associative cache, and a lookup procedure that may be performed therein based on a provided address.

FIG. 6 is a block diagram schematically illustrating performance of a normal lookup operation in an instruction cache. The instruction cache illustrated in FIG. 6 is a four-way set associative cache, comprising tag RAM storage 250 and data RAM storage 275. It will be appreciated that the techniques described herein apply equally to an n-way set associative instruction cache, and four ways has been chosen merely for illustration. The data RAM storage 275 provides four ways 280, 285, 290, 295, each way providing a plurality of cache lines. A corresponding cache line from each of the ways forms an associated set 320.

Similarly, the tag RAM storage 250 provides a plurality of ways 255, 260, 265, 270, each way providing an entry for a corresponding cache line in the data RAMs 275. Each entry is used to store a tag portion of an address applicable to the instructions stored in the corresponding cache line, and also can include other status bits, such as a valid bit to identify whether the entry is valid, and hence whether the corresponding cache line in the data RAMs is valid.

When an address 300 is used to perform a lookup within the instruction cache, an index portion 310 of the address is used to identify a set within the instruction cache. Accordingly, a lookup can be performed within the tag RAMs 250 to obtain the tag portion stored in each of the four entries associated with the set identified by the index portion 310 of the address, and those tag values can be output to the tag hit circuitry 325, where the tag value stored in any valid entry is compared against the tag portion 305 of the address 300. In the event that there is a match between the tag portion 305 of the address 300 and one of the tag values stored in a valid entry of the four tag entries identified using the index portion 310 of the address 300, then a hit condition will be detected, and the instructions in the corresponding cache line of the data RAMs 275 will be output over path 330. Otherwise, a cache miss will have occurred, and the address will be propagated onto a lower level of the cache hierarchy/main memory in order to retrieve the requested instructions.

Figure 7:
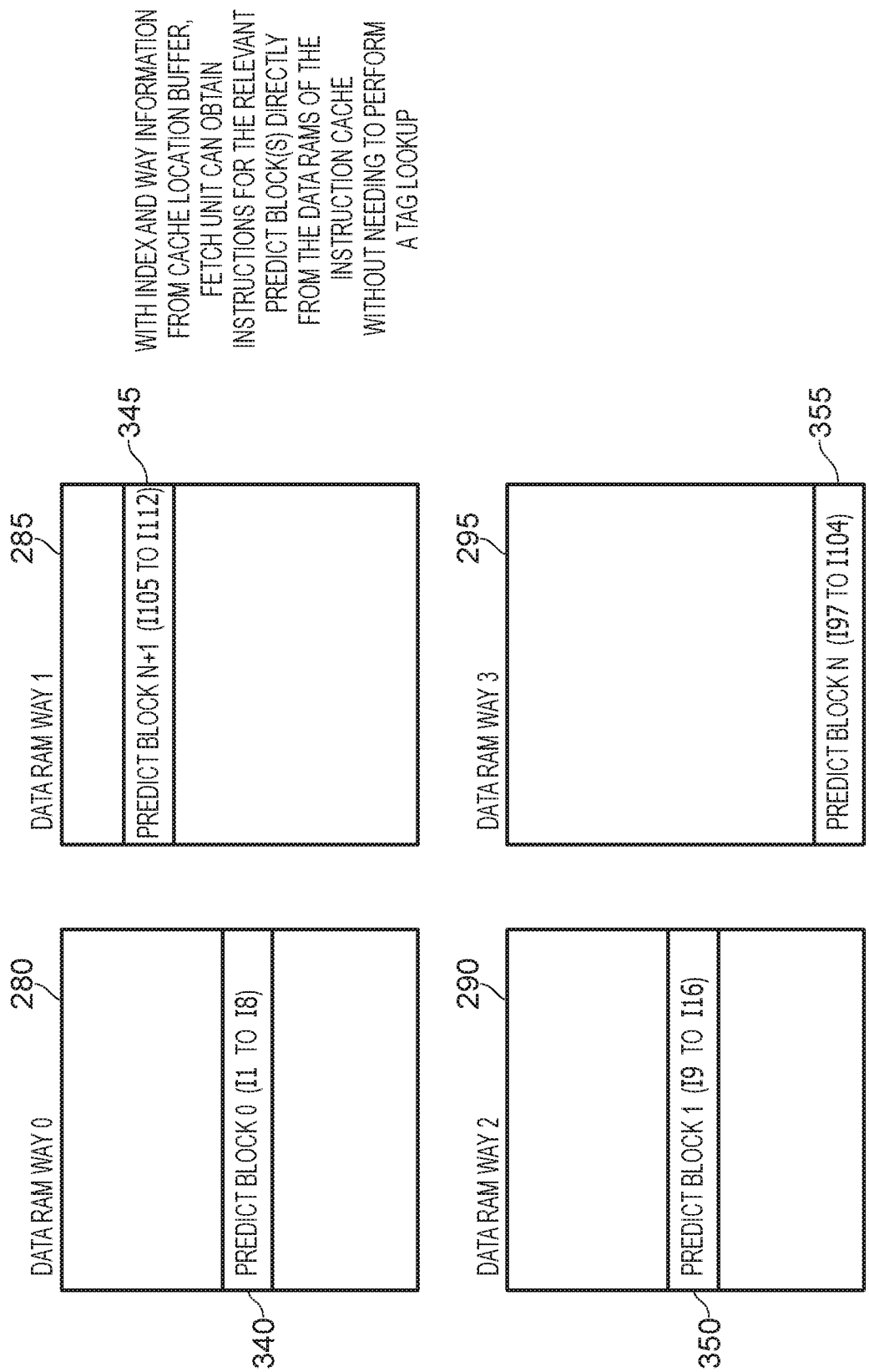
FIG. 7 illustrates how the use of the cache location information from the cache location buffer can avoid the need to perform an address-based lookup within the cache of FIG. 6, in accordance of one example arrangement.

As mentioned earlier, the cache location information stored in the cache location buffer 70 specifically identifies combinations of index and way identifying particular cache lines containing instructions of interest, i.e. instructions on a path opposite to the path predicted for the relevant branch instruction. Hence, when the fetch unit uses such cache location information, it no longer needs to perform a lookup within the tag RAMs 250 using an address, but instead can directly access the cache lines within the data RAMs 275. This is illustrated schematically in FIG. 7 for the specific example scenario of FIG. 2. Here, it is assumed that the four predict blocks shown in FIG. 2 are actually stored in specific cache lines spread across the ways of the data RAMs 275. In particular, it is assumed that in the entry of the cache location buffer associated with the branch instruction I3, the cache locations 340, 350 of the predict blocks 0 and 1 associated with the not taken path are stored within the cache location information maintained for the not taken path, whilst the cache location information for the taken path identifies the particular cache lines 355, 345 storing the predict blocks N and N+1. Hence, the fetch unit can directly access the data RAMs 280, 285, 290, 295 in order to retrieve the instructions at the cache line identified by the cache location information. This significantly reduces the time taken to access the instructions.

However, an even more significant benefit is that in the event of a flush, there is no need for the fetch circuitry to await the new target address output by the processing circuitry as part of the flush event before fetching the instructions required, and this can significantly reduce the misprediction penalty by reducing the latency associated with misprediction. This timing improvement is illustrated schematically in FIG. 8, which shows in the upper half progress through the execution pipeline without use of the present technique, and in the lower half shows the equivalent progress when using the present technique. During the issue cycles shown, it is assumed that a branch instruction is issued into the execution pipeline, whereafter during one or more execution cycles that branch instruction is executed, using branch resolution circuitry within the execution pipeline. In the second execute cycle it is detected that there was a misprediction of the direction of the branch, resulting in the need for a flush event to be triggered. During that flush event, the new target address for the next instruction that needs to be executed is computed as address A, and that is output as part of the flush event processing.

As shown in the upper half of the Figure, without using the present technique, then during the subsequent predict and fetch cycles a prediction will need to be made in respect of the predict block for address A, and the prediction result will be passed through to the fetch circuitry, where the fetch circuitry can then perform a lookup in the cache resources 50 in order to retrieve the required instructions. Here, it is assumed that the relevant instructions already reside within the mop cache, and hence after the instructions have been fetched from the mop cache, they can be dispatched directly to the rename stage of the processing circuitry, bypassing the decode stage. As will be understood by those skilled in the art, a rename stage can be provided to enable architectural registers specified by instructions to be remapped to a larger set of physical registers, to support out of order execution of instructions and thereby increase performance. Following the rename stage, instructions will then pass into the issue stage and the execute stage.

Figure 8:
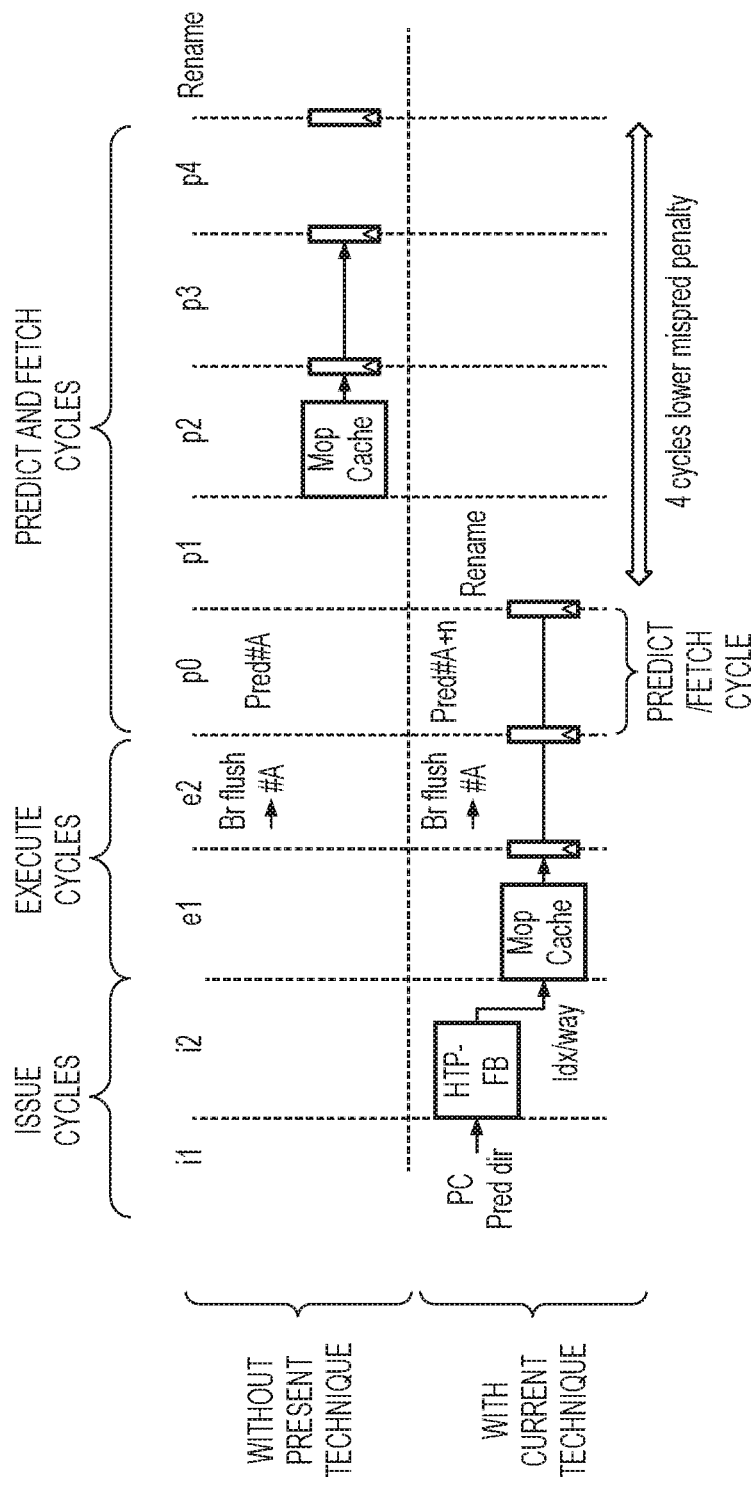
FIG. 8 is a timing diagram illustrating a reduction in the misprediction penalty that can be achieved when using the techniques described herein.

However, as shown by the lower half of FIG. 8, when using the technique described herein, following issuance of the branch instruction to the execute circuitry of the processing pipeline, a lookup can be performed within the cache location buffer (referred to in FIG. 8 as the HTP (hard to predict) fetch buffer). This lookup uses the program counter value of the current instruction (i.e. the instruction address of the branch instruction), and the predicted direction for that branch instruction to perform a lookup to see if there is a valid entry in the cache location buffer for that branch instruction that stores cache location information for the path opposite to the path predicted. If so, the index/way information forming that cache location information can be output to the fetch unit, enabling a lookup within the mop cache during the first execute cycle, in order to retrieve into buffers of the fetch unit the required instructions.

The progress of the branch instruction through the issue and execute cycles is the same as before, and hence again in the second execute cycle a misprediction in respect to the branch is detected, resulting in the issuance of the flush event and the identification of the target address A. As discussed earlier, the fetch unit can then merely check that the target address A is the same as the assumed target address retrieved from the field 115 of the relevant entry in the cache location buffer, assuming the actual branch direction is a taken direction and hence the address A identifies a non-contiguous address with respect to the program counter value. If instead the actual direction was not taken, no such check is needed. Assuming any such check is passed, the fetch circuitry is then able to immediately begin output of the relevant instructions to the processing circuitry. In particular, those instructions can be forwarded directly to the rename stage, bypassing the decode stage, since in this example those instructions have been retrieved from the mop cache.

At the start of the predict and fetch cycles, the prediction circuitry can begin making predictions for the predict block following the last instruction in the sequence of instructions retrieved from the mop cache using the index and way information, indicated in the Figure as being at address A+n. As shown in FIG. 8, the misprediction penalty is reduced by 4 cycles relative to a standard technique illustrated in the upper half of the Figure, hence providing a significant performance improvement.

FIG. 9 is a diagram schematically illustrating in more detail the cache location information that can be stored in either the field 110 or the field 125 of entries within the cache location buffer as illustrated in FIG. 3, along with associated validity information. As shown, the cache location information in the field 400 can provide index and way information for one or more blocks of instructions, and for each block a valid flag can be provided to form the validity information 405. This enables the information for individual blocks to be made valid before the information for later blocks is necessarily available. As shown in FIG. 9, the order in which blocks are made valid extends in a direction from the first block to the last block, and hence a later block cannot be made valid before all preceding blocks have been made valid. Hence, if there are just two blocks, it is possible that both blocks can be indicated as not valid, that the first block can be indicated as valid while the second block is not valid, or that both blocks can be indicated as valid.

Typically, the entries will be sized so as to specify a maximum number of blocks that can be specified in each of the sets of cache location information 110, 125. In one example implementation, the control circuitry 75 will continue to monitor the feedback information from the fetch unit with the aim of seeking to fully populate the available cache location information space within each of the entries, but may decide to terminate that process early under certain conditions. For example, it may be decided that if a further branch instruction is encountered whilst seeking to populate the cache location information, then the cache location information is terminated at the instruction before that branch instruction, so that the cache location information is used solely to identify a sequential series of instructions in each of the taken path and the not taken path up to the next encountered branch.

However, in other implementations, it may be possible to fetch across a branch instruction under certain circumstances. For instance, if that further branch instruction is unconditional, it will be known what branch direction is followed, and if the target address is static or highly predictable for that branch instruction it would be possible to reliably extend the sequence of instructions beyond the branch instruction, and capture the relevant index and way information within the cache location information.

Similarly, even if the branch instruction is conditional, if it is highly biased towards one direction, i.e. either strongly taken or strongly not taken, then again an assumption can be made as to the direction the branch will take, and the cache location information can be extended accordingly based on that assumption.

In some instances, it may be considered appropriate to only allow the fetch across a conditional branch instruction to occur if the conditional branch instruction is strongly biased as not taken, and hence no additional information needs to be captured about the outcome of the branch. However, alternatively, as illustrated in FIG. 9, an additional field 410 can be provided to capture certain fetch across information if the sequence extends through a strongly biased taken branch. In particular, the offset of that further branch instruction within the associated predict block can be captured so that it is known which instruction within the predict block is the branch instruction that has been predicted as taken. The target address of that further branch can also be captured, and optionally the branch type can be captured. All of this information will be output to the fetch unit with the cache location information, and in due course can be forwarded on by the fetch unit to the processing circuitry for use when performing the standard branch resolution operations when the branch instruction reaches the execution circuitry. It should be noted that provision of the branch type information if optional, and will depend on the type of branch resolution operations performed within the execution circuitry. For example, the branch execution unit may be arranged to check that the predicted branch type is the same as the actual branch type, and raise a misprediction if both values differ. However, if such check is not performed, then there will be no need for the branch type to be captured within the field 410.

It should be noted that the process of analysing the feedback information from the fetch unit in order to build up the cache location information could in principle be used to fetch across multiple branches, in which case the information shown in the field 410 would need to be captured for each predicted taken branch that is fetched across.

Figure 10:
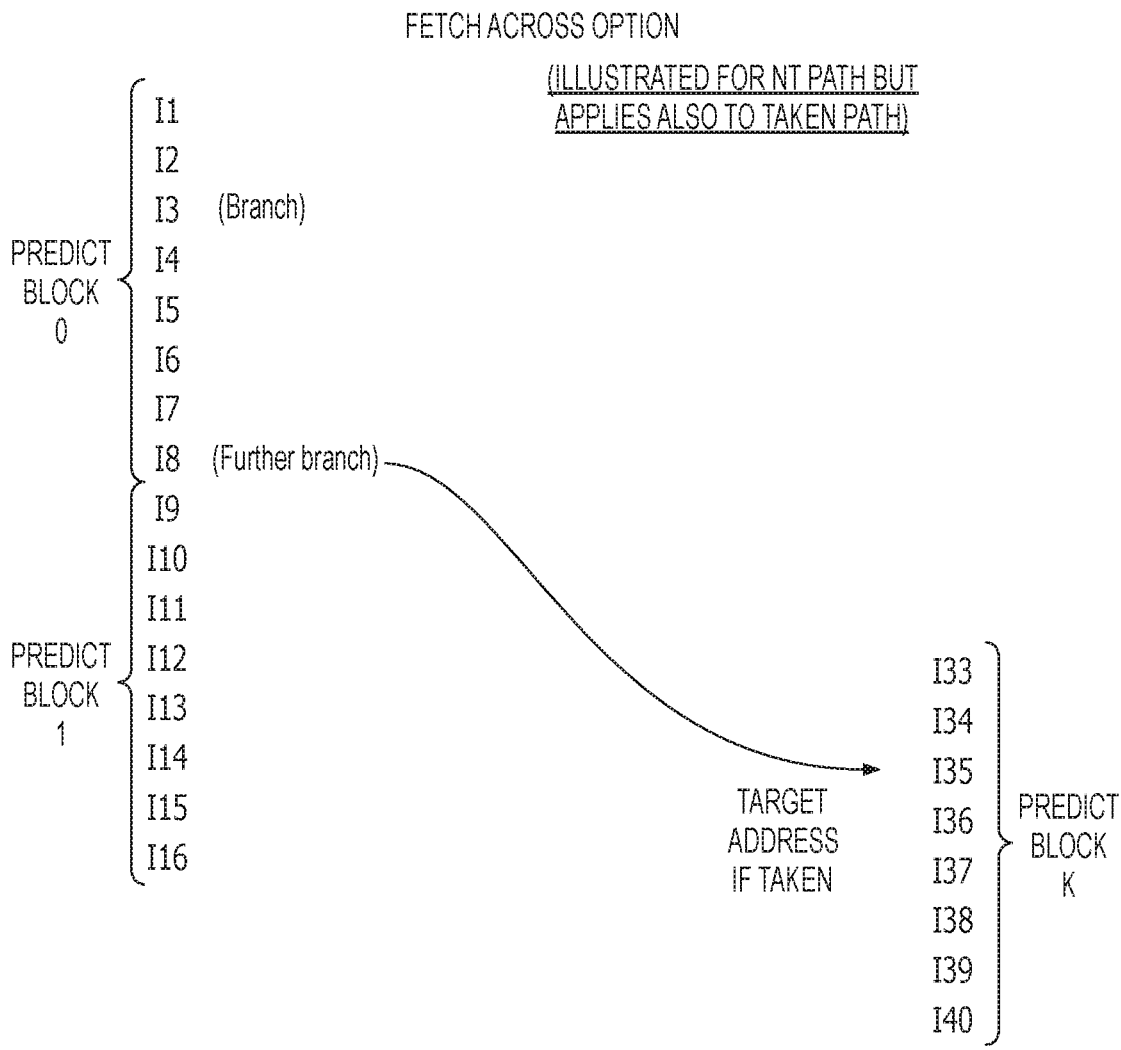
FIG. 10 is a diagram illustrating how the cache location information captured within an entry of the cache location buffer can allow fetching across a further branch instruction, in one example arrangement.

FIG. 10 schematically illustrates an example showing the cache location information that could be captured if it is decided to fetch across a branch. This example follows the earlier example of FIG. 2, but considers the not taken path of the branch instruction I3. Whilst the technique described in FIG. 10 is illustrated with respect to the not taken path, the same techniques can also be applied in relation to the taken path.

In this particular example it is assumed that instruction I8 is a further branch instruction. If it is known that instruction I8 is strongly biased to be taken, then the cache location information can be arranged to capture the index and way information for predict block 0 and the index and way information for predict block K. Further, the fetch across information in the field 410 may be arranged to identify the offset of instruction I8 in the predict block 0, the target address of that branch instruction (i.e. the address of instruction I35) and the type of branch. It will be appreciated that in instances where the predicted direction for the instruction I3 is that the branch instruction I3 will be taken, then a lookup can be performed within the relevant entry of the cache location buffer in order to retrieve the cache location information for the not taken path of instruction I3, and in this instance that will identify predict block 0 and predict block K, and provide all of the ancillary information about the branch instruction I8 mentioned above.

Similarly, if the branch instruction I8 is strongly biased to not be taken, then the cache location information captured for the not taken path of the branch instruction I3 can identify the index and way for predict block 0 and the index and way for predict block 1, and that information can be provided to the fetch unit following a lookup in the cache location buffer in instances where the predicted direction for the branch instruction I3 is taken, thereby enabling the fetch unit to retrieve this instructions I4 to I16 ahead of resolution of the branch instruction I3, so that if a misprediction is detected, and hence the not taken path should have been followed, the instructions have already been fetched and are ready to dispatch to the processing circuitry 35.

As also illustrated in FIG. 10, if the branch direction of instruction I8 is not strongly biased one way or the other, it may be decided to terminate the sequence of instructions at instruction I7, in which case the cache location information will just store the index and way information for predict block 0, and will also capture some offset information to identify that the last instruction to be output by the fetch unit, in the event that a misprediction causes the fetched instructions using the cache location information to be used, is instruction I7 rather than the very final instruction I8 in the predict block 0.

FIG. 11 illustrates an alternative form of cache location information that could be captured if it is decided to seek to fetch across a further branch instruction even though that further branch instruction does not have a strongly biased direction. Again, the example of FIG. 10 is considered. In a first field 450, the cache location information will identify the index and way information for predict block 0, this also being referred to herein as initial cache location information. Further, the offset of the branch instruction I8 in predict block 0 will be captured, as will an indication of its target address (in this example the address for instruction I35), and the type of branch, this information being captured within the field 455 shown in FIG. 11.

In addition, since the direction of the branch instruction I8 is not highly predictable, then both the taken and the not taken paths for the instruction I8 will also be captured as alternative cache location information. In particular, the index and way information for predict block K can be captured as first alternative cache location information (i.e. for the taken path from branch instruction I8) within the field 460, and the index and way for predict block 1 can be captured as second alternative cache location information (i.e. for the not taken path from instruction I8) within the field 470.

It will be appreciated that this hence captures all of the information required in respect of the not taken path from the branch instruction I3, capturing both possibilities for the outcome of the further branch instruction I8. However, when using this cache location information, it is clearly necessary to determine which of the alternative cache location information is to be used, and in one example this is achieved by caching the last direction prediction for the branch instruction I8 within a further field 475. It will be appreciated that this cached information can be updated each time a prediction is made for the branch instruction I8, but based on that cached information a decision can be made as to whether to use the index/way information in the field 460 or the index/way information in the field 470 when deciding on the cache location information to be output to the fetch circuitry for the not taken path of the branch instruction I3.

As discussed earlier, similar principles can be used to construct the cache location information for the taken path of the branch instruction I3.

As a further alternative implementation, rather than using the cached last direction prediction for the further branch instruction, the control circuitry 75 can issue a request to the branch prediction circuitry 10 to obtain a prediction for the branch instruction I8, and use the result of that prediction to determine which of the alternative cache location information to use.

Figure 12:
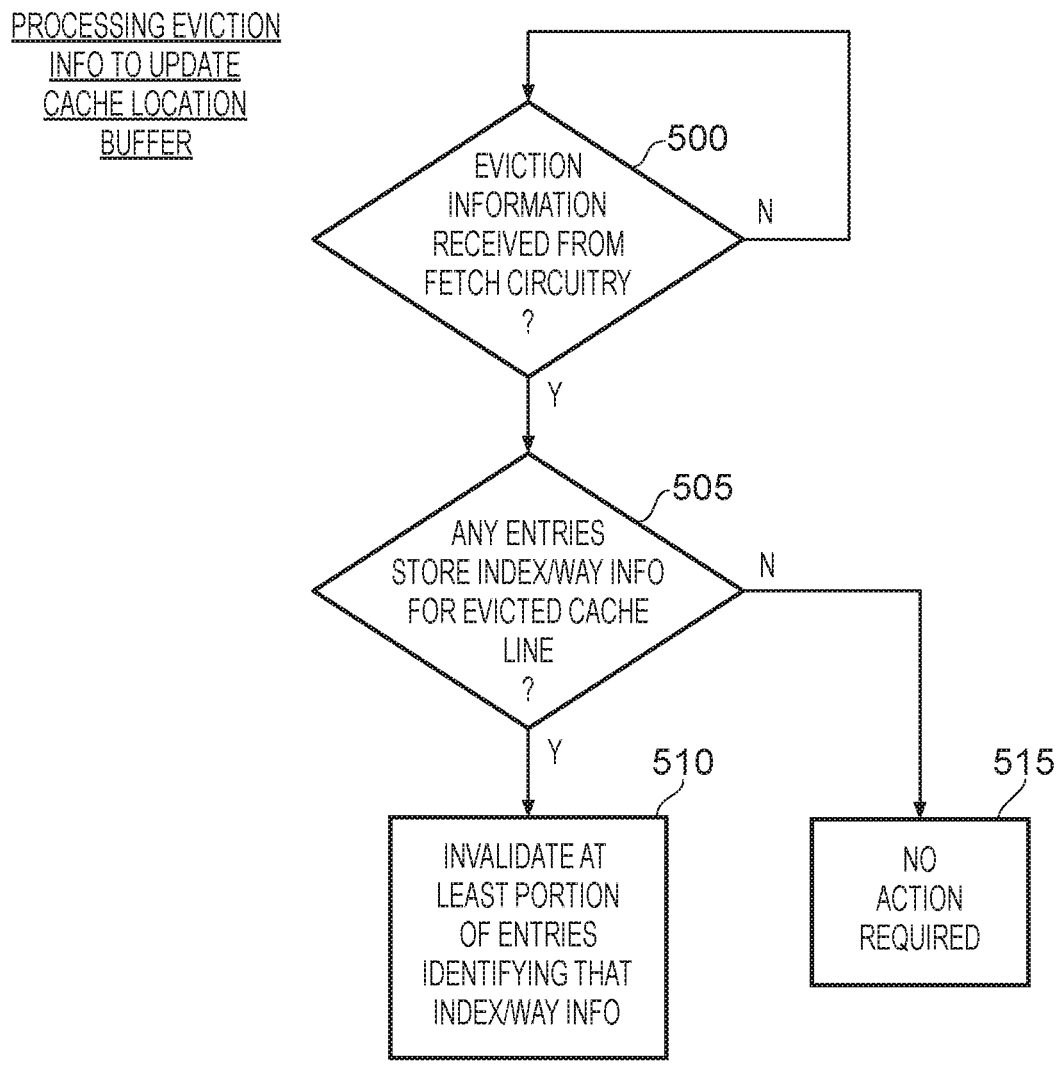
FIG. 12 is a flow diagram illustrating how eviction information can be used to update the contents of the cache location buffer, in accordance with one example arrangement.

FIG. 12 is a flow diagram showing how eviction information received from the fetch unit is used to update the cache location buffer. At step 500, the fetch unit is arranged, when a cache line is evicted from the relevant instruction cache resource 50, to output an indication of the index and way information for the evicted cache line to the control circuitry 75. When such eviction information is received, the control circuitry 75 then determines at step 505 whether there are any valid entries within the cache location buffer 70 that store that index and way information associated with the evicted cache line. If not, no further action is required, as indicated by step 515. However, if so, then at step 510 the control circuitry will cause at least the portion of the entries identifying that index and way information to be invalidated. This avoids out of date information being provided back in due course to the fetch unit as cache location information, and hence avoids the fetch unit fetching incorrect instructions by virtue of not taking into account eviction activity.

In the above description of example implementations, it will be appreciated that the techniques described herein can significantly reduce the misprediction latency in the event that a branch direction misprediction occurs. Further, the techniques can be implemented with low additional storage requirements. In particular, the instructions do not need to be re-stored, but instead only tracking information is kept identifying specific cache lines within either the instruction cache or the mop cache, and that information is used to allow the fetch circuitry to retrieve specific instructions from the cache based on the provided cache location information. Due to the low storage requirements, the number of instructions that can be identified for both the taken and the not taken paths can be significant. In particular, the captured information can cross multiple predict blocks, hence identifying potentially a significant number of instructions that can be immediately sent from the fetch unit to the processing circuitry in the event of a misprediction, and also allowing the prediction to resume from a later point (i.e. the predict block immediately following the last instruction output to the processing circuitry using the cache location information). Further, in some implementations the cache location information captured can be used to fetch across one or more further branch instructions. The technique described herein provides a very scalable solution, since it uses the existing structures for storing the actual instructions, namely the instruction cache or the mop cache, and the hard to predict branch circuitry 65 can be added with a requirement for only a relatively small additional storage to capture the information required within the cache location buffer.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
execution circuitry to execute instructions;
branch prediction circuitry to make branch direction predictions in respect of branch instructions;
fetch circuitry to fetch instructions from an instruction cache in dependence on the branch direction predictions and to forward the fetched instructions to the execution circuitry for execution;
a cache location buffer to store cache location information other than an instruction address for a given branch instruction for which accuracy of the branch direction predictions made by the branch prediction circuitry is below a determined threshold, the cache location information identifying where within the instruction cache one or more instructions are stored that will need to be executed in the event that a subsequent branch direction prediction made for the given branch instruction is incorrect; and
cache location buffer control circuitry, responsive to the subsequent branch direction prediction being made for the given branch instruction, to obtain from the cache location buffer the cache location information and to provide the obtained cache location information to the fetch circuitry so as to enable the fetch circuitry to retrieve from one or more locations of the instruction cache, the locations identified by the cache location information, the one or more instructions that are to be executed in the event that the execution circuitry determines that the subsequent branch direction prediction for the given branch instruction is incorrect,
wherein the cache location information stored in the cache location buffer references entries in a separate cache structure, wherein said separate cache structure is the instruction cache, and
wherein the cache location buffer control circuitry is arranged to provide the obtained cache location information to the fetch circuitry in time to enable the fetch circuitry, prior to completion of execution of the given branch instruction by the execution circuitry, to retrieve from the instruction cache the one or more instructions that are to be executed in the event that the execution circuitry determines that the subsequent branch direction prediction for the given branch instruction is incorrect.

2. The apparatus as claimed in claim 1, wherein:
the cache location information comprising first location information identifying where within the instruction cache one or more instructions are stored that are to be executed in the event that the given branch instruction has a taken branch direction, and second location information identifying where within the instruction cache one or more instructions are stored that are to be executed in the event that the given branch instruction has a not taken branch direction; and
the cache location buffer control circuitry is arranged to be responsive to a taken branch direction prediction being made for the given branch instruction, to obtain from the cache location buffer the second location information associated with the not taken branch direction, and is arranged to be responsive to a not taken branch direction prediction being made for the given branch instruction, to obtain from the cache location buffer the first location information associated with the taken branch direction.

3. The apparatus as claimed in claim 2, wherein an entry within the cache location buffer used to store the first location information comprises a target address field used to identify a predicted target address for the given branch instruction, and that predicted target address is provided to the fetch circuitry with the first location information.

4. The apparatus as claimed in claim 1, wherein:
the branch prediction circuitry is arranged to analyse blocks of instructions and to produce a prediction result for each block that is dependent on branch direction predictions made for any branch instructions appearing in the associated block; and
the apparatus further comprises a prediction queue to store the prediction results produced by the branch prediction circuitry in order to identify the instructions to be fetched by the fetch circuitry for execution by the execution circuitry; and
the one or more instructions for which cache location information is provided comprise instructions within one or more of the blocks of instructions.

5. The apparatus as claimed in claim 4, wherein:
when the execution circuitry determines that the subsequent branch direction prediction for the given branch instruction is incorrect, the fetch circuitry is arranged to forward to the execution circuitry the one or more instructions retrieved from the instruction cache using the obtained cache location information, and the branch prediction circuitry is arranged to resume prediction from a block of instructions subsequent to a last instruction of the one or more instructions retrieved from the instruction cache using the obtained cache location information.

6. The apparatus as claimed in claim 4, wherein the one or more instructions for which cache location information is provided comprises a contiguous sequence of instructions spanning one or more blocks of instructions.

7. The apparatus as claimed in claim 4, wherein the one or more instructions for which cache location information is provided comprise a sequence of instructions that incorporates as a non-final instruction within the sequence at least one further branch instruction, the sequence of instructions being determined by making an assumption as to the branch direction of that at least one further branch instruction.

8. The apparatus as claimed in claim 7, wherein the at least one further branch instruction is a branch instruction for which accuracy of the branch direction predictions made by the branch prediction circuitry is above a predictability threshold.

9. The apparatus as claimed in claim 7, wherein:
the cache location information comprises initial cache location information for an initial portion of the sequence of instructions up to a first of the at least one further branch instruction, and alternative sets of cache location information associated with the taken and not taken paths for each further branch instruction;
the branch prediction circuitry is used to predict a branch direction for the at least one further branch instruction in order to determine which of the alternative sets of cache location information to use in combination with the initial cache location information to identify cache locations for the determined sequence of instructions.

10. The apparatus as claimed in claim 7, wherein the at least one further branch instruction is a branch instruction that is predicted to have a not taken branch direction.

11. The apparatus as claimed in claim 7, wherein the at least one further branch instruction is a branch instruction that is predicted to have a taken branch direction, such that the one or more instructions for which the cache location information is provided comprises a sequence of instructions within at least two non-contiguous blocks of instructions.

12. The apparatus as claimed in claim 11, wherein an entry within the cache location buffer storing the cache location information further comprises an additional information field to identify at least a position within the sequence of each further branch instruction predicted to have a taken branch direction and a predicted target address for that further branch instruction.

13. The apparatus as claimed in claim 1, wherein the instruction cache has an n-way set associative cache structure, and the cache location information comprises index and way information for each cache line storing the one or more instructions for which the cache location information is provided.

14. The apparatus as claimed in claim 1, wherein:
the cache location buffer comprises a plurality of entries;
on detection that the accuracy of the branch direction predictions made by the branch prediction circuitry for the given branch instruction is below a determined threshold, the cache location buffer is arranged to allocate an entry to store the cache location information for that given branch instruction;
the cache location buffer is arranged to receive feedback information from the fetch circuitry indicative of locations within the instruction cache from which one or more instructions are obtained following taken and not taken branch direction predictions made in respect of the given branch instruction, to enable the cache location buffer to determine the cache location information to be stored in the allocated entry;
the allocated entry is made a valid entry once the cache location information has been populated in the entry based on the feedback information from the fetch circuitry; and
the cache location buffer control circuitry is arranged to only provide to the fetch circuitry cache location information obtained from valid entries in the cache location buffer.

15. The apparatus as claimed in claim 14, wherein separate entries are kept to identify the cache location information for the one or more instructions that are to be executed in the event that the given branch instruction has a taken branch direction, and to identify the cache location information for the one or more instructions that are to be executed in the event that the given branch instruction has a not taken branch direction.

16. The apparatus as claimed in claim 14, wherein:
separate validity flags are kept for the cache location information for the one or more instructions that are to be executed in the event that the given branch instruction has a taken branch direction, and for the cache location information for the one or more instructions that are to be executed in the event that the given branch instruction has a not taken branch direction; and
the cache location buffer control circuitry is arranged to use the separate validity flags to determine whether the entry is valid for the cache location information associated with the branch direction opposite to that identified by the subsequent branch direction prediction made for the given branch instruction.

17. The apparatus as claimed in claim 14, wherein:
the one or more instructions for which cache location information is provided comprise instructions within multiple blocks of instructions, and separate validity flags are kept in association with the cache location information for each block of instructions within the multiple blocks.

18. The apparatus as claimed in claim 14, wherein the cache location buffer is further arranged to receive eviction information indicating locations within the instruction cache from which instructions are evicted, to thereby cause the cache location buffer to invalidate an entry whose stored cache location information identifies a location from which instructions have been evicted since that entry was made a valid entry.

19. The apparatus as claimed in claim 4, wherein the fetch circuitry is arranged to arbitrate access to the instruction cache between the prediction results stored in the prediction queue and the obtained cache location information provided by the cache location buffer control circuitry.

20. The apparatus as claimed in claim 19, wherein the fetch circuitry is arranged to use the obtained cache location information in at least one clock cycle where fetching instructions using the obtained cache location information rather than fetching instructions using the prediction results will not impact performance of the execution circuitry.

21. The apparatus as claimed in claim 1, wherein the accuracy of the branch direction predictions made by the branch prediction circuitry for the given branch instruction is determined to be below the determined threshold when at least one misprediction of the branch direction has been made by the branch prediction circuitry for that given branch instruction.

22. The apparatus as claimed in claim 1, further comprising:
    hard to predict monitor circuitry to monitor branch resolution information provided by the execution circuitry for the given branch instruction for multiple previous instances of execution of that given branch instruction in order to determine whether the accuracy of the branch direction predictions made by the branch prediction circuitry for the given branch instruction is below the determined threshold;
    wherein the hard to predict monitor circuitry is arranged, in response to determining that the accuracy of the branch direction predictions made by the branch prediction circuitry for the given branch instruction is below the determined threshold, to cause the cache location buffer to allocate an entry to store the cache location information for that given branch instruction.

23. The apparatus as claimed in claim 1, wherein the instruction cache is used to store instructions fetched from memory, and the fetch circuitry is arranged to forward instructions fetched from the instruction cache to decode circuitry within the execution circuitry for decoding prior to execution by execution circuitry within the execution circuitry.

24. The apparatus as claimed in claim 1, wherein the instruction cache is arranged to store decoded instructions produced by decode circuitry within the execution circuitry, and the fetch circuitry is arranged to route to execution circuitry within the execution circuitry the decoded instructions fetched from the instruction cache that are to be executed.

25. A method of operating an apparatus to handle incorrect branch direction predictions, comprising:
    employing execution circuitry to execute instructions;
    making branch direction predictions in respect of branch instructions;
    employing fetch circuitry to fetch instructions from an instruction cache in dependence on the branch direction predictions and to forward the fetched instructions to the execution circuitry for execution;
    storing, within a cache location buffer, cache location information other than an instruction address for a given branch instruction for which accuracy of the branch direction predictions is below a determined threshold, the cache location information identifying where within the instruction cache one or more instructions are stored that will need to be executed in the event that a subsequent branch direction prediction made for the given branch instruction is incorrect; and
    responsive to the subsequent branch direction prediction being made for the given branch instruction, obtaining from the cache location buffer the cache location information and providing the obtained cache location information to the fetch circuitry so as to enable the fetch circuitry, ahead of execution of the given branch instruction by the execution circuitry, to retrieve from one or more locations of the instruction cache, the locations identified by the cache location information, the one or more instructions that are to be executed in the event that the execution circuitry determines that the subsequent branch direction prediction for the given branch instruction is incorrect,
    wherein the cache location information stored in the cache location buffer references entries in a separate cache structure, wherein said separate cache structure is the instruction cache, and
    wherein the obtained cache location information is provided to the fetch circuitry in time to enable the fetch circuitry, prior to completion of execution of the given branch instruction by the execution circuitry, to retrieve from the instruction cache the one or more instructions that are to be executed in the event that the execution circuitry determines that the subsequent branch direction prediction for the given branch instruction is incorrect.

* * * * *